(12) United States Patent
Mokuya

(10) Patent No.: US 7,729,002 B2
(45) Date of Patent: Jun. 1, 2010

(54) PRINT-JOB INFORMATION DISPLAY SYSTEM, PRINTING SYSTEM, PRINT-JOB MANAGER, PRINT-JOB MANAGER CONTROL PROGRAM AND METHOD, PRINTER, AND PRINTER CONTROL PROGRAM AND METHOD

(75) Inventor: Senichi Mokuya, Shiojiri (JP)

(73) Assignee: Seiko Epson Corporation (JP)

( * ) Notice: Subject to any disclaimer, the term of this patent is extended or adjusted under 35 U.S.C. 154(b) by 1099 days.

(21) Appl. No.: 11/392,844

(22) Filed: Mar. 29, 2006

(65) Prior Publication Data

US 2006/0221359 A1 Oct. 5, 2006

(30) Foreign Application Priority Data

Mar. 30, 2005 (JP) ............................. 2005-097567
Nov. 30, 2005 (JP) ............................. 2005-346127

(51) Int. Cl.
G06F 15/00 (2006.01)
G06K 1/00 (2006.01)

(52) U.S. Cl. ..................... 358/1.16; 358/1.15; 358/1.14

(58) Field of Classification Search .................. 358/1.1, 358/1.12–1.18; 709/245, 220; 726/26
See application file for complete search history.

(56) References Cited

U.S. PATENT DOCUMENTS 6,920,506 B2 * 7/2005 Barnard et al. .............. 709/245
6,952,780 B2 * 10/2005 Olsen et al. .................... 726/26
7,305,457 B2 * 12/2007 Yajima et al. ................ 709/220
2004/0046986 A1 3/2004 Kuwabara et al.
2006/0001898 A1 * 1/2006 Maeshima et al. ......... 358/1.14

FOREIGN PATENT DOCUMENTS

| JP | 09-039311 | 2/1997 |
| JP | 2001-256007 | 9/2001 |
| JP | 2001-306273 | 11/2001 |
| JP | 2002-240398 | 8/2002 |
| JP | 2003-256173 | 9/2003 |
| JP | 2004-021692 | 1/2004 |
| JP | 2004-072598 | 3/2004 |

* cited by examiner

*Primary Examiner*—Kimberly A Williams
(74) *Attorney, Agent, or Firm*—Harness, Dickey & Pierce, P.L.C.

(57) ABSTRACT

A print-job-information display system holds print jobs over a plurality of printers and displays information about a print job, for a predetermined system user, of among the print jobs being held. The system includes a collating-information acquiring section that acquires collating information to collate the system user, a plurality of print-job holding sections that hold a plurality of print jobs corresponding respectively to and relevant to the plurality of printers, in association with the collating information, a print-job-information acquiring section that acquires print-job information matched to the acquired collating information of among the information of the print jobs being held by the print-job holding sections, and a print-job-information display section that displays the acquired piece of print job information.

13 Claims, 21 Drawing Sheets

FIG. 15A

PRINT-JOB MANAGER 4A (123.456.789.001)

| USER | JOB | PRINT COUNT | PRINT DATE/HOUR |
|---|---|---|---|
| 0AB123 | fileA.doc | 2 | 2005/1/1 12:00 |
| 0AB124 | fileB.doc | 0 | 2005/1/2 13:00 |
| 0AB123 | fileC.doc | 0 | 2005/1/3 15:00 |
| 0AB123 | fileD.doc | 9 | 2005/1/1 14:00 |
| : | : | : | : |

FIG. 15B

PRINT-JOB MANAGER 4B (123.456.789.002)

| USER | JOB | PRINT COUNT | PRINT DATE/HOUR |
|---|---|---|---|
| 0AB123 | fileF.doc | 12 | 2005/1/2 17:00 |
| 0AB123 | fileG.doc | 0 | 2005/1/1 18:00 |
| 0AB124 | fileJ.doc | 7 | 2005/1/3 10:00 |
| 0AB122 | fileN.doc | 4 | 2005/1/1 11:00 |
| : | : | : | : |

FIG. 15C

PRINT-JOB MANAGER 4C (123.456.789.003)

| USER | JOB | PRINT COUNT | PRINT DATE/HOUR |
|---|---|---|---|
| 0AB123 | fileH.doc | 0 | 2005/1/2 21:00 |
| 0AB122 | fileI.doc | 3 | 2005/1/4 15:00 |
| 0AB123 | fileK.doc | 4 | 2005/1/1 16:00 |
| 0AB123 | fileM.doc | 0 | 2005/1/2 20:00 |
| 0AB123 | fileQ.doc | 24 | 2005/1/1 8:00 |
| 0AB123 | fileR.doc | 2 | 2005/1/1 17:00 |
| 0AB125 | fileS.doc | 1 | 2005/1/3 14:00 |
| : | : | : | : |

FIG.16A

PRINT JOB LIST (123.456.789.001)

| IP ADDRESS |
|---|
| 123.456.789.001 |
| PHYSICAL ARRANGEMENT INFORMATION |
| 90, 50 |

| PRINT JOB | PRINT COUNT | PRINT DATE/HOUR |
|---|---|---|
| fileA.doc | 2 | 2005/1/1 12:00 |
| fileB.doc | 0 | 2005/1/2 13:00 |
| fileD.doc | 9 | 2005/1/1 14:00 |

FIG.16B

PRINT JOB LIST (123.456.789.002) (HELD BY OWN)

| IP ADDRESS |
|---|
| 123.456.789.002 |
| PHYSICAL ARRANGEMENT INFORMATION |
| 10, 10 |

| PRINT JOB | PRINT COUNT | PRINT DATE/HOUR |
|---|---|---|
| fileF.doc | 12 | 2005/1/2 17:00 |
| fileG.doc | 0 | 2005/1/1 18:00 |

FIG.16C

PRINT JOB LIST (123.456.789.003)

| IP ADDRESS |
|---|
| 123.456.789.002 |
| PHYSICAL ARRANGEMENT INFORMATION |
| 10, 60 |

| PRINT JOB | PRINT COUNT | PRINT DATE/HOUR |
|---|---|---|
| fileH.doc | 0 | 2005/1/2 21:00 |
| fileK.doc | 4 | 2005/1/1 16:00 |
| fileM.doc | 0 | 2005/1/2 20:00 |
| fileQ.doc | 24 | 2005/1/1 8:00 |
| fileR.doc | 2 | 2005/1/1 17:00 |

FIG.18A

PRIORITY DETERMINATION (1)
REARRANGED BASED ON PRINT COUNT

| PRIORITY | JOB | PRINT COUNT | HOLD SITE |
|---|---|---|---|
| 1 | fileQ.doc | 24 | 123.456.789.003 |
| 2 | fileF.doc | 12 | 123.456.789.002 |
| 3 | fileD.doc | 9 | 123.456.789.001 |
| 4 | fileK.doc | 4 | 123.456.789.003 |
| 5 | fileA.doc | 2 | 123.456.789.001 |
| 6 | fileR.doc | 2 | 123.456.789.003 |
| 7 | fileB.doc | 0 | 123.456.789.001 |
| 8 | fileG.doc | 0 | 123.456.789.002 |
| 9 | fileH.doc | 0 | 123.456.789.003 |
| 10 | fileM.doc | 0 | 123.456.789.003 |

FIG.18B

PRIORITY DETERMINATION (2)
REARRANGED BASED ON THOSE UNPRINTED

| PRIORITY | JOB | PRINT COUNT | HOLD SITE |
|---|---|---|---|
| 1 | fileB.doc | 0 | 123.456.789.001 |
| 2 | fileG.doc | 0 | 123.456.789.002 |
| 3 | fileH.doc | 0 | 123.456.789.003 |
| 4 | fileM.doc | 0 | 123.456.789.003 |
| 5 | fileQ.doc | 24 | 123.456.789.003 |
| 6 | fileF.doc | 12 | 123.456.789.002 |
| 7 | fileD.doc | 9 | 123.456.789.001 |
| 8 | fileK.doc | 4 | 123.456.789.003 |
| 9 | fileA.doc | 2 | 123.456.789.001 |
| 10 | fileR.doc | 2 | 123.456.789.003 |

| PRIORITY | JOB | PRINT COUNT | HOLD SITE |
|---|---|---|---|
| 1 | fileG.doc | 0 | 123.456.789.002 |
| 2 | fileH.doc | 0 | 123.456.789.003 |
| 3 | fileM.doc | 0 | 123.456.789.003 |
| 4 | fileB.doc | 0 | 123.456.789.001 |
| 5 | fileQ.doc | 24 | 123.456.789.003 |
| 6 | fileF.doc | 12 | 123.456.789.002 |
| 7 | fileD.doc | 9 | 123.456.789.001 |
| 8 | fileK.doc | 4 | 123.456.789.003 |
| 9 | fileR.doc | 2 | 123.456.789.003 |
| 10 | fileA.doc | 2 | 123.456.789.001 |

☆ CHARACTER FONT
(COLOR, SHAPE, SIZE) CHANGED

☆ BACKGROUND (COLOR) CHANGED

☆ CHARACTER AND
BACKGROUND FLICKERED

☆ CHARACTER SCROLLED

☆ BOXED

☆ PUTTING AN ICON

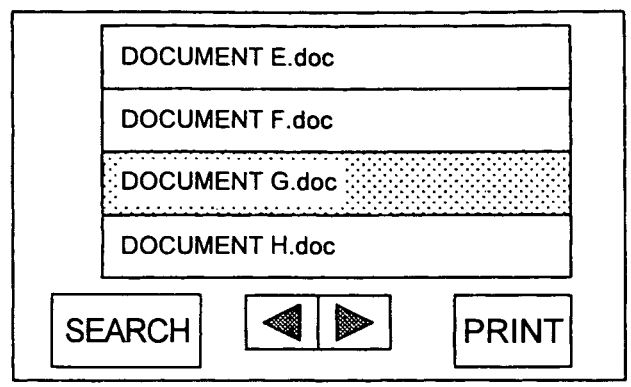
FIG.25A
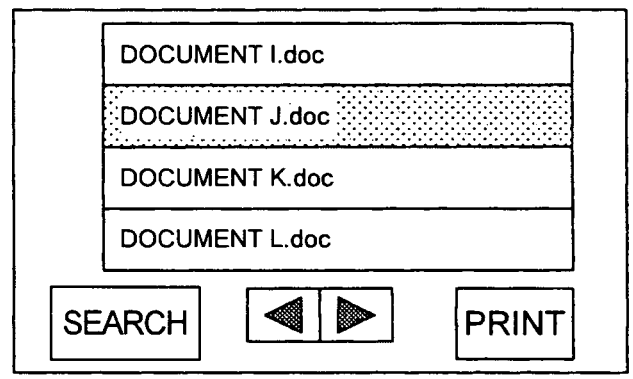
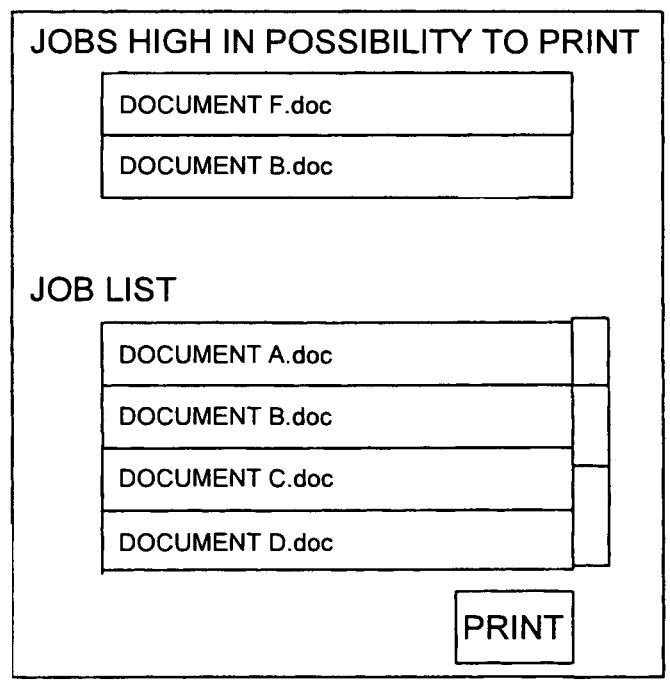
FIG.25B

PRINT-JOB INFORMATION DISPLAY SYSTEM, PRINTING SYSTEM, PRINT-JOB MANAGER, PRINT-JOB MANAGER CONTROL PROGRAM AND METHOD, PRINTER, AND PRINTER CONTROL PROGRAM AND METHOD

RELATED APPLICATIONS

This application claims priority to Japanese Patent Application Nos. 2005-97567 filed Mar. 30, 2005 and 2005-346127 filed Nov. 30, 2005 which are hereby expressly incorporated by reference herein in their entirety.

BACKGROUND

1. Technical Field

The present invention relates to a confidential printing system allowing for printing of only a print job whose system user is authenticated, and more particularly to a print-job-information-display system, program and method, print-job holding apparatus, print-job-holding-apparatus-control program and method, print-job manager, print-job-manager-control program and method, printer and printer-control program and method, that is suited to display the information of a print job whose system user is authenticated, as to a plurality of printers of a confidential printing system wherein the printers, having a confidential printing function, are connected through a network.

2. Related Art

There is an existing image-output control method and image-output apparatus, described in JP-A-2001-306273, wherein a person who instructed for printing is allowed to obtain a printing matter without being stolen a glance from a third person.

In the image-output control method and image-output apparatus of JP-A-2001-306273, when an authentication code is sent together with printing data from a client apparatus, a printer system generates collating data from the received printing data instead of immediately executing a printing. The printing data is encrypted by means of the authentication code, to generate save data. The save data and the collating data are associated together and stored in a storage device. When the user selects the save data and inputs an authentication code, the printer server decrypts the save data by use of the authentication code inputted, and determines whether or not the decryption has been done correctly. In the case correctly done, the decryption result is printed by the printer system.

In the system requiring a user's authentication upon printing an image, the printing data is temporarily held in the printers so that printing is allowed only for the printing data the user is authenticated, as in the existing art JP-A-2001-306273.

There is another existing art adapted to display a list of print-job information held by printers on a user-by-user basis. Printing is made only for the printing job corresponding to the information the user designated for a print job desired to print (see JP-A-9-39311).

However, in the art disclosed in JP-A-9-39311, where a plurality of print jobs are held, say, sporadically over a plurality of printers connected through a network, there is a difficulty in displaying a list of all the pieces of print-job information being held sporadically.

Meanwhile, such a list of print-job information is not desired to be glanced by a third person from a view point of the characteristic of the system of JP-A-2001-306273 and JP-A-9-39311. When a list is displayed in such a place as possibly glanced by a third person, the user desirably can search an objective print job in a short time to a possible extent.

SUMMARY

An advantage of some aspects of the invention is to provide a print-job information display system, printing system, print-job manager, print-job-manager-control program and method, printer, and printer-control program and method that is suited to display the information of print jobs matched to collating information of system users, as to a plurality of printers of a confidential printing system wherein the printers, having a confidential printing function, are connected through a network.

Form 1

According to a first aspect of the invention, there is provided a print-job-information display system that holds print jobs over a plurality of printers and displays information about a print job, for a predetermined system user, of among the print jobs being held, the system comprising: a collating-information acquiring section that acquires collating information to collate the system user; a plurality of print-job holding sections that hold a plurality of print jobs corresponding respectively to and relevant to the plurality of printers, in association with the collating information; a print-job-information acquiring section that acquires print-job information matched to the acquired collating information of among the information of the print jobs being held by the print-job holding sections; and a print-job-information display section that displays the acquired piece of print job information.

With this structure, for the printing system connecting, say, a plurality of printers through a network, the collating-information acquiring section is allowed to acquire collating information to collate the system user. The plurality of print-job holding sections are allowed to hold print jobs corresponding to and for the plurality of printers in association with the collating information. The print-job-information acquiring section is allowed to acquire print-job information matched to the acquired collating information out of the print-job information held by the print-job holding sections. The print-job-information display section is allowed to display the print-job information thus acquired.

Accordingly, this makes it possible to display all the pieces of print-job information, say, related to the system users on the plurality of printers connected through the network. Thus, there is provided an effect that the system user is allowed to simply know the content of the print job sent by himself/herself to the plurality of printers connected to the network, from the content displayed.

Here, the print job includes various pieces of information related to printing, i.e. information including, say, information about a system user instructed for printing, setting information related to the content of printing such as color printing, monochromatic printing and quality printing, and printing data proper, such as image data and text data, to be actually printed to a printing medium, such as a printing paper. This is the case with the following printing system, printing program and method, print-job holding apparatus, print-job holding apparatus control program and control method, print-job manager, print-job-manager-control program and method, printer, and printer-control program and method.

Meanwhile, the collating information is to identify an individual person or a group, e.g. information, unique to a system user, to identify the system user, or information, unique to a group, to identify the group. This is the case with the following printing system, printing program and method, print-job holding apparatus, print-job-holding-apparatus-control program and method, print-job manager, print-job-manager-control program and method, printer, and printer-control program and method.

The print-job information is information capable of identifying a print job, e.g. index information previously set for each print job, or a name of a data file included in a print job. This is the case with the following printing system, printing program and method, print-job holding apparatus, print-job holding-apparatus-control program and method, print-job manager, print-job-manager-control program and method, printer, and printer-control program and method.

Form 2

According to a second aspect of the invention, there is provided a print-job-information display program that holds print jobs over a plurality of printers and displays information about a print job, for a predetermined system user, of among the print jobs being held, the program is used for causing a computer to execute a process comprising: acquiring collating information to collate the system user; holding a plurality of print jobs corresponding respectively to and relevant to the plurality of printers, in association with the collating information; acquiring print-job information matched to the acquired collating information of among the information of the print jobs being held by the print-job holding sections; and displaying the acquired piece of print job information.

With this structure, by reading out the program and causing the computer to execute the process according to the read-out program, it is possible to obtain an operation and effect equivalent to that of the print-job-information display system of Form 1.

Form 3

According to a third aspect of the invention, there is provided a print-job-information display method that holds print jobs over a plurality of printers and displays information about a print job, for a predetermined system user, of among the print jobs being held, the method comprising: acquiring collating information to collate the system user; holding a plurality of print jobs corresponding respectively to and relevant to the plurality of printers, in association with the collating information; acquiring print-job information matched to the acquired collating information of among the information of the print jobs being held by the print-job holding sections; and displaying the acquired piece of print job information.

Due to this, it is possible to obtain an operation and effect equivalent to that of the print-job-information display system of Form 1.

Form 4

According to a fourth aspect of the invention, there is provided a printing system wherein a plurality of printers, for printing depending upon a print job, are connected through a network, to hold print jobs over the plurality of printers so that information of the print job, for a predetermined system user, can be displayed of among the print jobs being held, the system comprising: a collating-information acquiring section that acquires collating information to collate the system user; a plurality of print-job holding sections that hold a plurality of print jobs corresponding respectively to and relevant to the plurality of printers, in association with the collating information; a print-job-information acquiring section that acquires print-job information matched to the acquired collating information of among the information of the print jobs being held by the print-job holding sections; and a print-job-information display section that displays the acquired piece of print job information.

With this structure, the collating-information acquiring section is allowed to acquire collating information to collate the system user. The plurality of print-job holding sections are allowed to hold print jobs corresponding respectively to and related to the printers, in association with the collating information. The print-job-information acquiring section is allowed to acquire print-job information matched to the acquired collating information out of the information of print jobs being held by the print-job holding sections. The print-job-information display section is allowed to display the acquired print-job information.

This accordingly makes it possible to display all the pieces of print-job information related to the system users on the printers connected through the network. Thus, it is possible to obtain an effect that the system user is allowed to simply know the content of a print job sent by himself/herself to the plurality of printers connected to the network, from the content displayed.

Form 5

It is preferable that a plurality of print-job holding apparatus, mated respectively to the plurality of printers, and a print-job manager are mutually connected, for data communication, through the network, the print-job holding apparatus having the print-job holding section, a print-job search section that searches a print job matched to the collating information out of the print jobs being held by the print-job holding section according to the collating information from the print-job manager, and a print-job-information transmitting section that sends, to the print-job manager, a searched piece of print-job information according to a request from the print-job manager, the print-job manager having the collating-information acquiring section, the print-job-information acquiring section and the print-job-information display section, the print-job-information acquiring section that sends, to the print-job holding apparatus, collating information acquired by the collating-information acquiring section and a request for print-job information matched to the collating information.

With this structure, in the print-job holding apparatus, the print-job holding section is allowed to hold print jobs related to the printer, in association with the collating information. The print-job-information search section is allowed to search print-job information matched to the acquired collating information out of the print jobs being held by the print-job holding section, according to the collating information from the print-job manager. The print-job-information transmitting section is allowed to send, to the print-job manager, the information of a print job searched out according to the request from the print-job manager.

Meanwhile, in the print-job manager, the collating-information acquiring section is allowed to acquire collating information to collate a system user. The print-job-information acquiring section is allowed to acquire print-job information matched to the acquired collating information out of the information of the print jobs being held by the print-job holding sections. The print-job-information display section is allowed to display the print-job information thus acquired.

Furthermore, the print-job-information acquiring section is allowed to send, to the print-job holding apparatuses, the collating information acquired by the collating-information acquiring section and the request for the print-job information matched to the collating information.

For this reason, it is possible to display the information of all the print jobs related to the system users on the printers connected through the network. Thus, there is provided an effect that the system user is allowed to simply know the content of the print job sent by himself/herself to the plurality of printers connected to the network, from the content displayed.

In addition, by merely adding the print-job holding apparatus and print-job manager to the existing printing system, a confidential printing function can be added, thus enabling to simply obtain the effect as in the foregoing.

Form 6

It is preferred that the plurality of printers and a print-job manager are mutually connected, for data communication, through the network, the printer having the print-job holding section, a print-job search section that searches a print job matched to the collating information out of the print jobs being held by the print-job holding section according to the collating information from the print-job manager, and a print-job-information transmitting section that sends, to the print-job manager, a searched piece of print-job information according to a request from the print-job manager, the print-job manager having the collating-information acquiring section, the print-job-information acquiring section and the print-job-information display section, the print-job-information acquiring section being to send, to the printers, collating information acquired by the collating-information acquiring section and a request for print-job information matched to the collating information.

With this structure, in the printer, the print-job holding section is allowed to hold print jobs related to the printer, in association with the collating information. The print-job-information search section is allowed to search print-job information matched to the acquired collating information out of the print jobs being held by the print-job holding section, according to the collating information from the print-job manager. The print-job-information transmitting section is allowed to send, to the print-job manager, the information of a print job searched out according to the request from the print-job manager.

Meanwhile, in the print-job manager, the collating-information acquiring section is allowed to acquire collating information to collate a system user. The print-job-information acquiring section is allowed to acquire print-job information matched to the acquired collating information out of the information of the print jobs being held by the print-job holding apparatus. The print-job-information display section is allowed to display the print-job information thus acquired.

Furthermore, the print-job-information acquiring section is allowed to send, to the printers, the collating information acquired by the collating-information acquiring section and the request for the print-job information matched to the collating information.

For this reason, it is possible to display the information of all the print jobs related to the system users on the printers connected through the network. Thus, there is provided an effect that the system user is allowed to simply know the content of the print job sent by himself/herself to the plurality of printers connected to the network, from the content displayed.

In addition, because the printer is provided with the print-job holding function, search function, etc., it is possible to obtain an effect that the confidential printing system can be simplified in structure as compared to the case those functions are provided separately.

Form 7

It is preferable that a plurality of print instructors, for instructing the printer to make a printing of the print job according to an instruction from a system user, and a print-job manager are mutually connected, for data communication, through the network, the print instructor having the print-job holding section, a print-job search section that searches a print job matched to the collating information out of the print jobs being held by the print-job holding section depending upon collating information from the print-job manager, and a print-job-information transmitting section that sends to the print-job manager a searched piece of print-job information according to a request from the print-job manager, the print-job manager having the collating-information acquiring section, the print-job-information acquiring section and the print-job-information display section, the print-job-information acquiring section being to send, to the print instructor, collating information acquired by the collating-information acquiring section and a request for print-job information matched to the collating information.

With this structure, in the print instructor, the print-job holding section is allowed to hold print jobs related to the printer, in association with the collating information. The print-job search section is allowed to search a print job matched to the acquired collating information out of the print jobs being held by the print-job holding section, according to the collating information from the print-job manager. The print-job-information transmitting section is allowed to send, to the print-job manager, the information of a print job searched out according to the request from the print-job manager.

Meanwhile, in the print-job manager, the collating-information acquiring section is allowed to acquire collating information to collate a system user. The print-job-information acquiring section is allowed to acquire print-job information matched to the authenticated system user, out of the information of the print jobs being held by the print-job holding sections. The print-job-information display section is allowed to display the print-job information thus acquired.

Furthermore, the print-job-information acquiring section is allowed to send, to the printers, the collating information acquired by the collating-information acquiring section and the request for the print-job information matched to the collating information.

For this reason, it is possible to display the information of all the print jobs related to the system users on the printers connected through the network. Thus, there is provided an effect that the system user is allowed to simply know the content of the print job sent by himself/herself to the plurality of printers connected to the network, from the content displayed.

In addition, because the print instructor, which is used by a system user to instruct the printer to make an printing, is provided with the print-job holding function, search function, etc., it is possible to obtain an effect that the confidential printing system can be simplified in structure as compared to the case those functions are provided separate.

Form 8

It is preferable that the print-job acquiring section is to send the collating information acquired by the collating-information acquiring section to the apparatuses connected to the network, and perform a transmission process of the request depending upon a reply to the collating information thus sent, the apparatus having the print-job search section having a search-result-information transmitting section to send a search result due to the print-job search section to the print-job manager.

With this structure, collating information can be broadcast. It is possible to obtain an effect that the apparatus, holding a print job relevant to the system-user collating information, can be detected by the less number of communications.

Form 9

It is preferable that the print-job manager has a search-information transmitting section to send search information for searching an apparatus having the print-job search section in each of the apparatuses connected to the network, the print-job acquiring section being to perform a transmission process of the collating information depending upon the reply, of from the apparatus, to the search information, the apparatus having the print-job search section having a reply transmitting section to send, to the print-job manager, a reply to the search information.

With this structure, collating information can be sent only to the apparatuses having print-job holding sections without the need to send collating information to the apparatus not requiring same, e.g. broadcasting system-user collating information. Thus, it is possible to obtain an effect that processing can be effected comparatively securely.

Form 10

It is preferable that the printer has the collating-information acquiring section, the print-job holding section, a print-job search section that searches a print job matched to the collating information out of the print jobs being held in the print-job holding section according to the collating information, a print-job-information acquiring section that acquires, from another of the printers, print-job information matched to the collating information acquired in an own printer, a print-job-information transmitting section that sends to the other printer a searched piece of print-job information according to the collating information acquired from the other printer, in response to the request from the other printer, and the print-job-information display section, the print-job-information acquiring section being to send, to the other printer, collating information acquired by the collating-information acquiring section and a request for print-job information matched to the collating information, the print-job-information display section being to display the searched piece of print-job information and print-job information acquired from the other printer.

With this structure, in the printer, the collating-information acquiring section is allowed to acquire collating information to collate a system user. The print-job holding section is allowed to hold a print job related to the printer, in association with the collating information. The print-job search section is allowed to search a print job matched to the collating information out of the print jobs being held by the print-job holding section. The print-job-information acquiring section is allowed to acquire the print-job information matched to the collating information acquired in the own printer, from another printer. The print-job-information transmitting section is allowed to send, to the other printer, the information of the print job searched out. The print-job-information display section is allowed to display the print-job information thus acquired.

Furthermore, the print-job-information acquiring section is allowed to send, to the other printer, the collating information acquired by the collating-information acquiring section and a request for the print-job information matched to the collating information. The print-job-information display section is allowed to display the information of the print job searched out and the print-job information acquired from the other printer.

For this reason, it is possible to display the information of all the print jobs related to the system users on the printers connected through the network. Thus, there is provided an effect that the system user is allowed to simply know the content of the print job sent by himself/herself to the plurality of printers connected to the network, from the content displayed.

In addition, because the functions of the invention are provided to all the printers, it is possible to obtain an effect that the confidential printing system can be simplified in structure as compared to the case those functions are provided separately.

Form 11

It is preferable that the plurality of printers and print-job managers mated respectively to the plurality of printers are mutually connected, for data communication, through the network, the print-job manager having the collating-information acquiring section, the print-job holding section, a print-job search section that searches a print job matched to the collating information out of the print jobs being held in the print-job holding section according to the collating information, a print-job-information acquiring section that acquires, from another print-job manager, print-job information matched to the collating information acquired in the print-job manager of an own, a print-job-information transmitting section that sends, to the other print-job manager, a searched piece of print-job information according to the collating information acquired from the other printer, in response to the request from the other printer, and the print-job-information display section, the print-job-information acquiring section being to send, to the other print-job manager, collating information acquired by the collating-information acquiring section and a request for print-job information matched to the collating information, the print-job-information display section being to display the searched piece of print-job information and the print-job information acquired from the other print-job manager.

With this structure, in the print-job manager, the collating-information acquiring section is allowed to acquire collating information to collate a system user. The print-job holding section is allowed to hold a print job related to the printer, in association with the collating information. The print-job search section is allowed to search a print job matched to the collating information out of the print jobs being held by the print-job holding section, according to the collating information. The print-job-information acquiring section is allowed to acquire the print-job information, relevant to the collating information acquired by the own print-job manager, from another print-job manager. The print-job-information transmitting section is allowed to send, to the other print-job manager, the information of the print job searched out in response to a request from the other print-job manager.

Furthermore, the print-job-information acquiring section is allowed to send, to the other print-job manager, the collating information acquired by the collating-information acquiring section and the request for the print-job information matched to the collating information. The print-job-information display section is allowed to display the information of the print job searched out and the print-job information acquired from the other print-job manager.

For this reason, it is possible to display the information of all the print jobs related to the system users on the printers connected through the network. Thus, there is provided an effect that the system user is allowed to simply know the content of the print job sent by himself/herself to the plurality of printers connected to the network, from the content displayed.

In addition, because the functions of the invention are entirely provided to the print-job manager, the confidential printing function can be added to the existing printing system by merely adding the print-job manager thereto. The foregoing effect can be obtained simply.

Form 12

It is preferable that the print-job-information acquiring section is to send the collating information to another apparatus after encrypting the collating information.

With this structure, even if the collating information be illicitly stolen on the network, it can be made difficult to identify a system user thereof, thus providing an effect that print-job information can be display-processed with security.

Form 13

It is preferred that there are further comprised of a print-job-information selecting section that selects, according to an instruction from the system user, print-job information matched to the instruction, out of displayed pieces of print-job information due to the print-job-information display section, and a printing section that causes a predetermined one of the printers to make a printing of a selected piece of print job information due to the print-job-information selecting section.

With this structure, the print-job-information selecting section is allowed to select, according to an instruction from the system user, print-job information relevant to the instruction out of the print-job information displayed by the print-job-information display section. The printing section can cause a predetermined one of the printers to execute a printing of a print job of the information selected by the print-job information selecting section.

Thus, there is provided an effect that the system user is allowed to select, on the apparatus displaying print-job information, a desired print job out of all the print jobs being held for the printers connected to the network, and simply make a printing thereof.

Form 14

It is preferable that there are further comprised of a print-job-information selecting section that selects, according to an instruction from the system user, print-job information matched to the instruction, out of displayed pieces of print-job information due to the print-job-information display section, and a print-job deleting section that deletes a print job corresponding to the selected piece of print job information due to the print-job-information selecting section from an apparatus holding the print job.

With this structure, the print-job-information selecting section is allowed to select print-job information relevant to the instruction out of the print-job information displayed by the print-job-information display section, according to an instruction from the system user. The print-job deleting section is allowed to delete a print job corresponding to the print-job information selected by the print-job-information selecting section from an apparatus holding the print job.

Thus, there is provided an effect that the system user is allowed to select and simply delete, on the apparatus displaying print-job information, a desired print job out of all the print jobs being held for the printers connected to the network.

Form 15

It is preferable that the print-job-information display section, when displaying the print-job information, displays preferentially print-job information higher in possibility to make a printing of among those pieces of print-job information to display.

With this structure, because the print job higher in possibility to print is preferentially displayed, it is made easier for the system user to find out a print job desired for printing. Thus, there is provided an effect that the time a print job is displayed can be shortened to decrease the possibility the information displayed be looked by a third person.

Form 16

It is preferable that there is further comprised of a print-count-information acquiring section that acquires information about a print count as to print job, the print-job-information display section being to display the print-job information in an order of greater print count as to print job of among those pieces of print-job information to display, depending upon the print-count information acquired.

With this structure, the print-count-information acquiring section is allowed to acquire the information about a print count of print job. The print-job-information display section is allowed to display the print-job information in the order of greater print count as to print job of among those pieces of print-job information to display, depending upon the print-count information acquired.

Accordingly, there is a high possibility that printing be repeated as to the print job higher in print frequency. Because the print job higher in possibility to print is preferentially displayed, it is made easier for the system user to find out a print job desired for printing. Thus, there is provided an effect that the time a print job is displayed can be shortened to decrease the possibility the information displayed be looked by a third person.

Form 17

It is preferable that there is further comprised of a print-count-information acquiring section that acquires information about a print count as to print job, the print-job-information display section being to display preferentially the print-job information, printing of which is not yet done, of among those pieces of print-job information to display, depending upon the print-count information acquired.

With this structure, the print-count-information acquiring section is allowed to acquire the information about a print count of print job. The print-job-information display section is allowed to display preferentially the information of a print job, printing of which is not yet done, of among those pieces of print-job information to display.

Accordingly, in the case there is a print job printing of which is not yet done of among those being held, the print job higher in possibility to print is preferentially displayed because there is a high possibility that the relevant print job be next processed for printing. This makes easier for the system user to find out a print job desired for printing. Thus, there is provided an effect that the time a print job is displayed can be shortened to decrease the possibility the information displayed be glanced by a third person.

Form 18

It is preferable that there is further comprised of a positional-relationship-information acquiring section that acquires positional-relationship information between an apparatus having the print-job display section and an apparatus having the print-job holding section, the print-job-information display section being to display preferentially print-job information held in the print-job holding section as physical distance is closer between the apparatus having the print-job display section and the apparatus having the print-job-information holding section of among those pieces of print-job information to display, depending upon the positional-relationship information acquired.

With this structure, the positional-relationship-information acquiring section is allowed to obtain positional-relationship information of between an apparatus having a print-job display section and an apparatus having a print-job holding section. Depending upon the positional-relationship information acquired, the print-job-information display section is allowed to display preferentially print-job information held in the print-job holding section of among those pieces of print-job information to display as physical distance is closer between the apparatus having the print-job display section and the apparatus having the print-job-information holding section of among those pieces of print-job information to display.

For example, where the apparatus having the print-job display section and the printer are in a close location to each other and the apparatus having the print-job holding section and the printer are in a close location to each other (or integrated together), the reason the system user changes the place where to operate the printer or the like can be considered the case the printer on which printing is intended to perform is impossible to use because of being in failure or under use over a long time. Namely, the present embodiment is to display preferentially a print job being held in the apparatus closest in position from the apparatus at which operation has been done. This enhances the possibility that the system user find out a print job desired to make a printing. Thus, there is provided an effect that the time a print job is displayed can be shortened to decrease the possibility the information displayed be looked by a third person.

Form 19

According to a fifth aspect of the invention, there is provided a printing program used to display information of a print job for a predetermined system user of among those pieces of print-job information related to a plurality of printers, for printing based on a print job, connected through a network, the program being for use in causing a computer to execute a process comprising: acquiring collating information to collate the system user; holding a plurality of print jobs corresponding respectively to and relevant to the plurality of printers, in association with the collating information; acquiring print-job information matched to the acquired collating information of among the information of the print jobs being held by the print-job holding sections; and displaying the acquired piece of print job information.

With this structure, when the computer reads out the program and executes the process according to the program, operation and effect can be obtained equivalent to that of the printing system of form 2.

Form 20

It is preferable that the collating information is sent to another apparatus after being encrypted.

With this structure, when the computer reads out the program and executes the process according to the program, operation and effect can be obtained equivalent to that of the printing system of form 10.

Form 21

It is preferable that there are further comprised of selecting, according to an instruction from the system user, print-job information matched to the instruction, out of displayed pieces of print-job information due to the print-job-information display section, and performing a printing of a print job corresponding to the selected piece of print job information due to the print-job-information selecting section.

With this structure, when the computer reads out the program and executes the process according to the program, operation and effect can be obtained equivalent to that of the printing system of form 11.

Form 22

It is preferable that there are further comprised of selecting, according to an instruction from the system user, print-job information matched to the instruction, out of displayed pieces of print-job information, and deleting a print job corresponding to the selected piece of print job information from an apparatus holding the print job.

With this structure, when the computer reads out the program and executes the process according to the program, operation and effect can be obtained equivalent to that of the printing system of form 14.

Form 23

It is preferable that there are further comprised of displaying preferentially print-job information higher in possibility to make a printing of among those pieces of print-job information to display when displaying the print-job information.

With this structure, when the computer reads out the program and executes the process according to the program, operation and effect can be obtained equivalent to that of the printing system of form 15.

Form 24

It is preferred that there is further comprised of acquiring information about a print count as to print job, and displaying the print-job information in an order of greater print count as to print job of among those pieces of print-job information to display, depending upon the print-count information acquired.

With this structure, when the computer reads out the program and executes the process according to the program, operation and effect can be obtained equivalent to that of the print-job-information display system of form 16.

Form 25

It is preferable that there is further comprised of acquiring information about a print count as to print job, to display preferentially the print-job information, printing of which is not yet done, of among those pieces of print-job information to display, depending upon the print-count information acquired.

With this structure, when the computer reads out the program and executes the process according to the program, operation and effect can be obtained equivalent to that of the printing system of form 17.

Form 26

It is preferable that there is further comprised of acquiring positional-relationship information between an apparatus having the print-job display section and an apparatus having the print-job holding section, to display preferentially print-job information held in the print-job holding section as physical distance is closer between the apparatus having the print-job display section and the apparatus having the print-job-information holding section of among those pieces of print-job information to display, depending upon the positional-relationship information acquired.

With this structure, when the computer reads out the program and executes the process according to the program, operation and effect can be obtained equivalent to that of the printing system of form 18.

Form 27
According to a sixth aspect of the invention, there is provided a computer-readable recording medium recording a printing program of form 19.

This provides an operation and effect similar to that of the printing program of form 19, and makes it possible to send and receive the print-job-information display program through a recording medium, such as a CD-ROM, a DVD-ROM or an MO.

Form 28
According to a seventh aspect of the invention, there is provided a printing method for use in displaying information of a print job for a predetermined system user of among those print jobs being held over a plurality of printers, for printing based on a print job, connected through a network, the method comprising: acquiring collating information to collate the system user; holding print jobs corresponding respectively to and relevant to the plurality of printers, in association with the collating information; acquiring print-job information matched to the acquired collating information of among the information of the print jobs being held; and displaying the acquired piece of print job information.

This obtains an operation and effect equivalent to that of the printing system of form 4.

Form 29
It is preferable that the collating information is sent to another apparatus after encrypting the collating information.

This obtains an operation and effect equivalent to that of the printing system of form 12.

Form 30
It is preferable that there are further comprised of selecting, according to an instruction from the system user, print-job information matched to the instruction, out of displayed pieces of print-job information, and causing a predetermined one of the printers to make a printing of a selected piece of print job information.

This obtains an operation and effect equivalent to that of the printing system of form 13.

Form 31
It is preferable that there are comprised of selecting, according to an instruction from the system user, print-job information matched to the instruction, out of displayed pieces of print-job information, and deleting a print job corresponding to the selected piece of print job information from an apparatus holding the print job.

This obtains an operation and effect equivalent to that of the printing system of form 14.

Form 32
It is preferable that displaying preferentially print-job information higher in possibility to make a printing of among those pieces of print-job information to display when displaying the print-job information.

This obtains an operation and effect equivalent to that of the printing system of form 15.

Form 33
It is preferable there is further comprised of acquiring information about a print count as to print job, to display the print-job information in an order of greater print count as to print job of among those pieces of print-job information to display, depending upon the print-count information acquired.

This obtains an operation and effect equivalent to that of the printing system of form 16.

Form 34
It is preferable there is further comprised of acquiring information about a print count as to print job, to display preferentially the print-job information, printing of which is not yet done, of among those pieces of print-job information to display, depending upon the print-count information acquired.

This obtains an operation and effect equivalent to that of the printing system of form 17.

Form 35
It is preferable there is further comprised of a program used for causing a computer to execute to acquiring positional-relationship information between an apparatus having the print-job display section and an apparatus having the print-job holding section, to display preferentially print-job information held in the print-job holding section as physical distance is closer between the apparatus having the print-job display section and the apparatus having the print-job-information holding section of among those pieces of print-job information to display, depending upon the positional-relationship information acquired.

This obtains an operation and effect equivalent to that of the printing system of form 18.

Form 36
According to an eighth aspect of the invention, there is provided a print-job holding apparatus in a printing system that holds print jobs over a plurality of printers, for printing based on a print job, connected through a network, the apparatus comprising: a print-job holding section that holds a print job related to an own printer, in association with collating information to collate a system user; a print-job search section that searches, according to the collating information from the print-job manager, a print job matched to the collating information out of print jobs being held in the print-job holding section; and a print-job-information transmitting section that sends, to the print-job manager, information of a searched print job in response to a request corresponding to the collating information.

This structure obtains an operation and effect similar to that of the print-job holding apparatus of form 5.

Form 37
According to a ninth aspect of the invention, there is provided a print-job-holding-apparatus control program for use in controlling a print-job holding apparatus in a printing system that holds print jobs over a plurality of printers, for printing based on a print job, connected through a network, the program being for use in causing a computer to execute a process comprising: holding a print job relevant to an own printer, in association with the collating information; searching a print job matched to the collating information out of print jobs being held, according to the collating information; and sending, to the print-job manager, a searched piece of print-job information matched to the collating information in response to a request corresponding to the collating information.

With this structure, when the computer reads out the program and executes the process according to the program, operation and effect can be obtained equivalent to that of the printing system of form 36.

Form 38
According to a tenth aspect of the invention, there is provided a computer-readable recording medium that records a print-job-holding-apparatus control program of form 37.

This provides an operation and effect similar to that of the print-job-holding-apparatus control program of form 37, and makes it possible to send and receive the print-job-holding-apparatus control program through a recording medium, such as a CD-ROM, a DVD-ROM or an MO.

Form 39

According to an eleventh aspect of the invention, there is provided a print-job-holding-apparatus control method for use in controlling a print-job holding apparatus in a printing system that holds print jobs over a plurality of printers, for printing based on a print job, connected through a network, the method comprising: holding a print job relevant to an own printer, in association with collating information to collate a system user; searching a print job matched to the collating information out of print jobs being held, according to the collating information from the print-job manager; and sending, to the print-job manager, a searched piece of print-job information matched to a request corresponding to the collating information from the print-job manager.

This provides an operation and effect similar to that of the printing-job holding apparatus of form 36.

Form 40

According to a twelfth aspect of the invention, there is provided a print-job manager comprising: a collating-information acquiring section that acquires collating information to collate a system user; a print-job-information acquiring section that acquires print-job information matched to the collating information acquired, out of the information of print jobs held in a print-job holding apparatus holding a print job as to a printer mated to an own print-job manager; and a print-job-information display section that displays print-job information acquired whereby the print-job-information acquiring section is to send, to the print-job holding apparatus, collating information acquired by the collating-information acquiring section and a request for print-job information matched to the collating information.

This structure can obtain an operation and effect similar to that of the print-job manager in the printing system of form 5.

Form 41

According to a thirteenth aspect of the invention, there is provided a print-job manager comprising: a collating-information acquiring section that acquires collating information to collate a system user; a print-job holding section that holds a print job for a printer mated to an own print-job manager, in association with the collating information; a print-job search section that searches a print job matched to the collating information out of print jobs being held in the print-job holding section, according to the collating information; a print-job-information acquiring section that acquires, from another apparatus, print-job information matched to the collating information about a system user authenticated by an own print-job manager; a print-job-information transmitting section that sends, to the other apparatus, a searched piece of print-job information due to the searching based on the collating information acquired from the other apparatus, in response to a request from the other apparatus; and a print-job-information display section that displays the print-job information acquired; whereby the print-job-information acquiring section is to send, to the other apparatus, the collating information acquired by the collating-information acquiring section and the request for print-job information matched to the collating information, the print-job-information display section being to display the information of a print job searched out by the searching and the print-job information acquired from the other apparatus.

This structure can obtain an operation and effect similar to that of the print-job manager in the printing system of form 11.

Form 42

It is preferable that the print-job-information acquiring section sends the collating information to another apparatus after encrypting the collating information.

This structure can obtain an operation and effect similar to that of the printing system of form 12.

Form 43

It is preferable that there are further comprised of a print-job-information selecting section that selects, according to an instruction from the system user, print-job information matched to the instruction, out of displayed pieces of print-job information due to the print-job-information display section, and a printing section that causes a predetermined one of the printers to make a printing of a selected piece of print job information due to the print-job-information selecting section.

This structure can obtain an operation and effect similar to that of the printing system of form 13.

Form 44

It is preferable that there are further comprised of a print-job-information selecting section that selects, according to an instruction from the system user, print-job information matched to the instruction, out of displayed pieces of print-job information due to the print-job-information display section, and a print-job deleting section that deletes a print job corresponding to the selected piece of print job information due to the print-job-information selecting section from an apparatus holding the print job.

This structure can obtain an operation and effect similar to that of the printing system of form 14.

Form 45

It is preferable that the print-job-information display section, when displaying the print-job information, displays preferentially print-job information higher in possibility to make a printing of among those pieces of print-job information to display.

This structure can obtain an operation and effect similar to that of the printing system of form 15.

Form 46

It is preferable that there is further comprised of a print-count-information acquiring section that acquires information about a print count as to print job, the print-job-information display section being to display the print-job information in an order of greater print count as to print job of among those pieces of print-job information to display, depending upon the print-count information acquired.

This structure can obtain an operation and effect similar to that of the printing system of form 16.

Form 47

It is preferable that there is further comprised of a print-count-information acquiring section that acquires information about a print count as to print job, the print-job-information display section being to display preferentially the print-job information, printing of which is not yet done, of among those pieces of print-job information to display, depending upon the print-count information acquired.

This structure can obtain an operation and effect similar to that of the printing system of form 17.

Form 48

It is preferable that there is comprised of a positional-relationship-information acquiring section that acquires positional-relationship information between an apparatus having the print-job display section and an apparatus having the print-job holding section, the print-job-information display section being to display preferentially print-job information held in the print-job holding section as physical distance is closer between the apparatus having the print-job display section and the apparatus having the print-job-information holding section of among those pieces of print-job information to display, depending upon the positional-relationship information acquired.

This structure can obtain an operation and effect similar to that of the printing system of form 18.

Form 49

According to a fourteenth aspect of the invention, there is provided a print-job-manager control program for use in causing a computer to execute a process comprising: acquiring collating information to collate a system user; acquiring print-job information matched to the collating information acquired out of the information of print jobs being held; and displaying the print-job information acquired; whereby the collating information acquired and the request for print-job information matched to the collating information are sent to the print-job holding apparatus.

With this structure, when the computer reads out the program and executes the process according to the program, operation and effect can be obtained equivalent to that of the print-job manager of form 40.

Form 50

According to a fifteenth aspect of the invention, there is provided a print-job-manager control program for use in causing a computer to execute a process comprising: acquiring collating information to collate a system user; holding a print job in association with the collating information; searching a print job matched to the collating information out of print jobs being held, according to the collating information acquired; acquiring print-job information matched to the collating information about a system user authenticated; sending, in response to a request, a searched piece of print-job information matched to the collating information, to the apparatus sent the request; and displaying the print-job information acquired; whereby the collating information and the request for print-job information matched to the collating information are sent, to display the searched piece of print-job information and the print-job information acquired.

With this structure, when the computer reads out the program and executes the process according to the program, operation and effect can be obtained equivalent to that of the print-job manager of form 41.

Form 51

It is preferable that the collating information is sent to another apparatus after being encrypted.

With this structure, when the computer reads out the program and executes the process according to the program, operation and effect can be obtained equivalent to that of the print-job manager of form 42.

Form 52

It is preferable that there are further comprised of selecting, according to an instruction from the system user, print-job information matched to the instruction, out of displayed pieces of print-job information, and causing a predetermined one of the printers to make a printing of a selected piece of print job information.

With this structure, when the computer reads out the program and executes the process according to the program, operation and effect can be obtained equivalent to that of the print-job manager of form 43.

Form 53

It is preferable that there are further comprised of selecting, according to an instruction from the system user, print-job information matched to the instruction, out of displayed pieces of print-job information, and deleting a print job corresponding to the selected piece of print job information from an apparatus holding the print job.

With this structure, when the computer reads out the program and executes the process according to the program, operation and effect can be obtained equivalent to that of the print-job manager of form 44.

Form 54

It is preferable that, when displaying the print-job information, displayed preferentially is print-job information higher in possibility to make a printing of among those pieces of print-job information to display.

With this structure, when the computer reads out the program and executes the process according to the program, operation and effect can be obtained equivalent to that of the print-job manager of form 45.

Form 55

It is preferable that there is further comprised of acquiring information about a print count as to print job, to display the print-job information in an order of greater print count as to print job of among those pieces of print-job information to display, depending upon the print-count information acquired.

With this structure, when the computer reads out the program and executes the process according to the program, operation and effect can be obtained equivalent to that of the print-job manager of form 46.

Form 56

It is preferable that there is further comprised of acquiring information about a print count as to print job, to display preferentially the print-job information, printing of which is not yet done, of among those pieces of print-job information to display, depending upon the print-count information acquired.

With this structure, when the computer reads out the program and executes the process according to the program, operation and effect can be obtained equivalent to that of the print-job manager of form 47.

Form 57

It is preferable that there is further comprised of acquiring positional-relationship information between an apparatus having the print-job display section and an apparatus having the print-job holding section, to display preferentially print-job information held in the print-job holding section as physical distance is closer between the apparatus having the print-job display section and the apparatus having the print-job-information holding section of among those pieces of print-job information to display, depending upon the positional-relationship information acquired.

With this structure, when the computer reads out the program and executes the process according to the program, operation and effect can be obtained equivalent to that of the print-job manager of form 48.

Form 58

According to a sixteenth aspect of the invention, there is provided a computer-readable recording medium recording a print-job-manager control program of form 49.

This provides an operation and effect similar to that of the print-job-manager control program of form 49, and makes it possible to simply send and receive the print-job-holdingapparatus control program through a recording medium, such as a CD-ROM, a DVD-ROM or an MO.

Form 59

According to a seventeenth aspect of the invention, there is provided a print-job-manager control method comprising: acquiring collating information to collate a system user; acquiring print-job information matched to the collating information acquired out of the information of print jobs being held; and displaying the print-job information acquired; whereby the collating information acquired and the request for print-job information matched to the collating information are sent to the print-job holding apparatus.

This can obtain an operation and effect equivalent to that of the print-job manager of form 40.

Form 60

According to an eighteenth aspect of the invention, there is provided a print-job-manager control method comprising: acquiring collating information to collate a system user; holding a print job in association with the collating information; searching a print job matched to the collating information out of print jobs being held, according to the collating information acquired; acquiring print-job information matched to the collating information acquired; sending, in response to a request, a searched piece of print-job information matched to the collating information, to the apparatus sent the request; and displaying the print-job information acquired; whereby the collating information and a request for print-job information matched to the collating information are sent, to display the searched piece of print-job information and the print-job information acquired.

This can obtain an operation and effect equivalent to that of the print-job manager of form 41.

Form 61

It is preferable that the collating information is sent to another apparatus after being encrypted.

This can obtain an operation and effect equivalent to that of the print-job manager of form 42.

Form 62

It is preferable that there are further comprised of selecting, according to an instruction from the system user, print-job information matched to the instruction, out of displayed pieces of print-job information, and causing a predetermined one of the printers to make a printing of a selected piece of print job information.

This can obtain an operation and effect equivalent to that of the print-job manager of form 43.

Form 63

It is preferable that there are further comprised of selecting, according to an instruction from the system user, print-job information matched to the instruction, out of displayed pieces of print-job information, and deleting a print job corresponding to the selected piece of print job information from an apparatus holding the print job.

This can obtain an operation and effect equivalent to that of the print-job manager of form 44.

Form 64

It is preferable that, when displaying the print-job information, displayed preferentially is print-job information higher in possibility to make a printing of among those pieces of print-job information to display.

This can obtain an operation and effect equivalent to that of the print-job manager of form 45.

Form 65

It is preferable that there is further comprised of acquiring information about a print count as to print job, to display preferentially the print-job information in an order of greater print count as to print job of among those pieces of print-job information to display, depending upon the print-count information acquired.

This can obtain an operation and effect equivalent to that of the print-job manager of form 46.

Form 66

It is preferable that there is further comprised of acquiring information about a print count as to print job, to display preferentially the print-job information, printing of which is not yet done, of among those pieces of print-job information to display, depending upon the print-count information acquired.

This can obtain an operation and effect equivalent to that of the print-job manager of form 47.

Form 67

It is preferable that there is further comprised of acquiring positional-relationship information between an apparatus having the print-job display section and an apparatus having the print-job holding section, to display preferentially print-job information held in the print-job holding section as physical distance is closer between the apparatus having the print-job display section and the apparatus having the print-job-information holding section of among those pieces of print-job information to display, depending upon the positional-relationship information acquired.

This can obtain an operation and effect equivalent to that of the print-job manager of form 48.

Form 68

According to an nineteenth aspect of the invention, there is provided a printer for performing a printing based on a print job, the printer comprising: a print-job holding section that holds a print job related to an own printer, in association with collating information to collate a system user; a print-job search section that searches, according to the collating information from the print-job manager, a print job matched to the collating information out of print jobs being held in the print-job holding section; and a print-job-information transmitting section that sends, to the print-job manager, information of a searched print job in response to a request from the print-job manager.

This structure obtains an operation and effect similar to that of the printer in the printing system of form 6.

Form 69

According to a twentieth aspect of the invention, there is provided a printer comprising: a collating-information acquiring section that acquires collating information to collate a system user; a print-job holding section that holds a print job relevant to an own printer, in association with the collating information; a print-job search section that searches a print job matched to the collating information out of print jobs being held in the print-job holding section, according to the collating information; a print-job-information acquiring section that acquires, from another apparatus, print-job information matched to the collating information acquired by an own printer; a print-job-information transmitting section that sends, to the other apparatus, a searched piece of print-job information due to the searching based on the collating information acquired from the other apparatus, in response to a request from the other apparatus; and a print-job-information display section that displays the print-job information acquired; whereby the print-job-information acquiring section is to send, to the other apparatus, the collating information acquired by the collating-information acquiring section and the request for print-job information matched to the collating information, the print-job-information display section being to display the information of a print job searched out by the searching and the print-job information acquired from the other apparatus.

This structure can obtain an operation and effect similar to that of the printer in the printing system of form 10.

Form 70

It is preferable that the print-job-information acquiring section sends the collating information to another apparatus after encrypting the collating information.

This structure can obtain an operation and effect similar to that of the printing system of form 12.

Form 71

It is preferable that there are further comprised of a print-job-information selecting section that selects, according to an instruction from the system user, print-job information matched to the instruction from the system user, out of displayed pieces of print-job information due to the print-job-information display section, and a printing section that causes a predetermined one of the printers to make a printing of a selected piece of print job information due to the print-job-information selecting section.

This structure can obtain an operation and effect similar to that of the printing system of form 13.

Form 72

It is preferable that there are further comprised of a print-job-information selecting section that selects, according to an instruction from the system user, print-job information matched to the instruction, out of displayed pieces of print-job information due to the print-job-information display section, and a print-job deleting section that deletes a print job corresponding to the selected piece of print job information due to the print-job-information selecting section from an apparatus holding the print job.

This structure can obtain an operation and effect similar to that of the printing system of form 14.

Form 73

It is preferable that the print-job-information display section, when displaying the print-job information, displays preferentially print-job information higher in possibility to make a printing of among those pieces of print-job information to display.

This structure can obtain an operation and effect similar to that of the printing system of form 15.

Form 74

It is preferable that there is further comprised of a print-count-information acquiring section that acquires information about a print count as to print job, the print-job-information display section being to display preferentially the print-job information in an order of greater print count as to print job of among those pieces of print-job information to display, depending upon the print-count information acquired.

This structure can obtain an operation and effect similar to that of the printing system of form 16.

Form 75

It is preferable that there is further comprised of a print-count-information acquiring section that acquires information about a print count as to print job, the print-job-information display section being to display preferentially the print-job information, printing of which is not yet done, of among those pieces of print-job information to display, depending upon the print-count information acquired.

This structure can obtain an operation and effect similar to that of the printing system of form 17.

Form 76

It is preferable that there is comprised of a positional-relationship-information acquiring section that acquires positional-relationship information between an apparatus having the print-job display section and an apparatus having the print-job holding section, the print-job-information display section being to display preferentially print-job information held in the print-job holding section as physical distance is closer between the apparatus having the print-job display section and the apparatus having the print-job-information holding section of among those pieces of print-job information to display, depending upon the positional-relationship information acquired.

This structure can obtain an operation and effect similar to that of the printing system of form 18.

Form 77

According to a twenty-first aspect of the invention, there is provided a printer control program for use in causing a computer to execute a process comprising: holding a print job in association with the collating information to collate a system user; searching a print job matched to the collating information out of print jobs being held, according to the collating information; and sending, a searched piece of print-job information to the apparatus sent the request, in response to the request.

With this structure, when the computer reads out the program and executes the process according to the program, operation and effect can be obtained equivalent to that of the printer of form 68.

Form 78

According to a twenty-second aspect of the invention, there is provided a printer control program for use in causing a computer to execute a process, comprising: acquiring collating information to collate a system user; holding a print job related to an own printer in association with the collating information; searching a print job matched to the collating information out of print jobs being held, according to the collating information acquired; acquiring print-job information matched to the collating information acquired; sending, in response to a request, a searched piece of print-job information matched to the collating information to an apparatus sent the request; and displaying the print-job information acquired; whereby the collating information and a request for print-job information matched to the collating information are sent to an apparatus as a subject-of-transmission, to display, the searched piece of print-job information and the print-job information acquired from the other apparatus.

With this structure, when the computer reads out the program and executes the process according to the program, operation and effect can be obtained equivalent to that of the printer of form 69.

Form 79

It is preferable that the collating information is sent to another apparatus after being encrypted.

With this structure, when the computer reads out the program and executes the process according to the program, operation and effect can be obtained equivalent to that of the printer of form 70.

Form 80

It is preferable that there are further comprised of selecting, according to an instruction from the system user, print-job information matched to the instruction, out of displayed pieces of print-job information, and causing a predetermined one of the printers to make a printing of a selected piece of print job information.

With this structure, when the computer reads out the program and executes the process according to the program, operation and effect can be obtained equivalent to that of the printer of form 71.

Form 81

It is preferable that there are further comprised of selecting, according to an instruction from the system user, print-job information matched to the instruction, out of displayed pieces of print-job information, and deleting a print job corresponding to the selected piece of print job information from an apparatus holding the print job.

With this structure, when the computer reads out the program and executes the process according to the program, operation and effect can be obtained equivalent to that of the printer of form 72.

Form 82

It is preferable that, when displaying the print-job information, displayed preferentially is print-job information higher in possibility to make a printing of among those pieces of print-job information to display.

With this structure, when the computer reads out the program and executes the process according to the program, operation and effect can be obtained equivalent to that of the printer of form 73.

Form 83

It is preferable that there is further comprised of acquiring information about a print count as to print job, to display preferentially the print-job information in an order of greater print count as to print job of among those pieces of print-job information to display, depending upon the print-count information acquired.

With this structure, when the computer reads out the program and executes the process according to the program, operation and effect can be obtained equivalent to that of the printer of form 74.

Form 84

It is preferable that there is further comprised of acquiring information about a print count as to print job, to display preferentially the print-job information, printing of which is not yet done, of among those pieces of print-job information to display, depending upon the print-count information acquired.

With this structure, when the computer reads out the program and executes the process according to the program, operation and effect can be obtained equivalent to that of the printer of form 75.

Form 85

It is preferable that there is further comprised of acquiring positional-relationship information between an apparatus having the print-job display section and an apparatus having the print-job holding section, to display preferentially print-job information held in the print-job holding section as physical distance is closer between the apparatus having the print-job display section and the apparatus having the print-job-information holding section of among those pieces of print-job information to display, depending upon the positional-relationship information acquired.

With this structure, when the computer reads out the program and executes the process according to the program, operation and effect can be obtained equivalent to that of the printer of form 76.

Form 86

According to a twenty-third aspect of the invention, there is provided a computer-readable recording medium recording a printer-control program of form 77.

This provides an operation and effect similar to that of the printer-control program of form 77, and makes it possible to send and receive the printer-control program through a recording medium, such as a CD-ROM, a DVD-ROM or an MO.

Form 87

According to a twenty-fourth aspect of the invention, there is provided a printer control method comprising: holding a print job in association with collating information to collate a system user; searching a print job matched to the collating information out of print jobs being held, according to the collating information; and sending, in response to a request, a searched piece of print job information to the apparatus sent the request.

This can obtain an operation and effect equivalent to that of the printer of form 68.

Form 88

According to a twenty-fifth aspect of the invention, there is provided a printer control method comprising: acquiring collating information to collate a system user; holding a print job related to an own printer in association with the collating information; searching a print job matched to the collating information out of print jobs being held, according to the collating information; acquiring print-job information matched to the collating information acquired; sending, in response to a request, a searched piece of print-job information matched to the collating information to an apparatus sent the request; and displaying the print-job information acquired; whereby the collating information and a request for print-job information matched to the collating information are sent to an apparatus as a subject-of-transmission, to display, the searched piece of print-job information and the print-job information acquired from the other apparatus.

This can obtain an operation and effect equivalent to that of the printer of form 69.

Form 89

It is preferable that the collating information is sent to another apparatus after being encrypted.

This can obtain an operation and effect equivalent to that of the printer of form 70.

Form 90

It is preferable that there are further comprised of selecting, according to an instruction from the system user, print-job information matched to the instruction, out of displayed pieces of print-job information, and causing a predetermined one of the printers to make a printing of a selected piece of print job information.

This can obtain an operation and effect equivalent to that of the printer of form 71.

Form 91

It is preferable that there are further comprised of selecting, according to an instruction from the system user, print-job information matched to the instruction, out of displayed pieces of print-job information, and deleting a print job corresponding to the selected piece of print job information from an apparatus holding the print job.

This can obtain an operation and effect equivalent to that of the printer of form 72.

Form 92

It is preferable that, when displaying the print-job information, displayed preferentially is print-job information higher in possibility to make a printing of among those pieces of print-job information to display.

This can obtain an operation and effect equivalent to that of the printer of form 73.

Form 93

It is preferable that there is further comprised of acquiring information about a print count as to print job, to display preferentially the print-job information in an order of greater print count as to print job of among those pieces of print-job information to display, depending upon the print-count information acquired.

This can obtain an operation and effect equivalent to that of the printer of form 74.

Form 94

It is preferable that there is further comprised of acquiring information about a print count as to print job, to display preferentially the print-job information, printing of which is not yet done, of among those pieces of print-job information to display, depending upon the print-count information acquired.

This can obtain an operation and effect equivalent to that of the printer of form 75.

Form 95

It is preferable that there is further comprised of acquiring positional-relationship information between an apparatus having the print-job display section and an apparatus having the print-job holding section, to display preferentially print-job information held in the print-job holding section as physical distance is closer between the apparatus having the print-job display section and the apparatus having the print-job-information holding section of among those pieces of print-job information to display, depending upon the positional-relationship information acquired.

This can obtain an operation and effect equivalent to that of the printer of form 76.

BRIEF DESCRIPTION OF THE DRAWINGS

The invention will be described with reference to the accompanying drawings, wherein like numbers reference like elements.

FIGS. 15A-15C are figures showing an example of the pieces of information of print jobs respectively held in first to third print-job managers.

FIGS. 16A-16C are figures showing an example of the pieces of information about print jobs, for the particular system users, held respectively in first to third print-job managers.

FIG. 18A is a figure showing an example of an order-on-display rearranged in the order of greater print count while FIG. 18B is a figure showing an example of an order-on-display rearranged in the order by placing priority to those having a print count 0, further to the showing in FIG. 18A.

FIG. 19A is a figure showing a positional relationship of between the first to third print-job managers on a real space while FIG. 19B is a figure showing an example of an order-on-display rearranged based on the positional relationship given in FIG. 19A.

FIG. 25A is a figure showing an example that a search button is provided to search for those pieces of print-job information higher in possibility to print while FIG. 25B is a figure showing an example separately displaying those pieces of print-job information higher in possibility to print.

DESCRIPTION OF EXEMPLARY EMBODIMENTS

With reference to the drawings, description will be now made on embodiments of the present invention. There are illustrated, in FIGS. 1 to 21, embodiments of a print-job information display system, printing system, print-job manager, print-job manager control program and method, printer, and printer control program and method, according to the invention.

Figure 1:
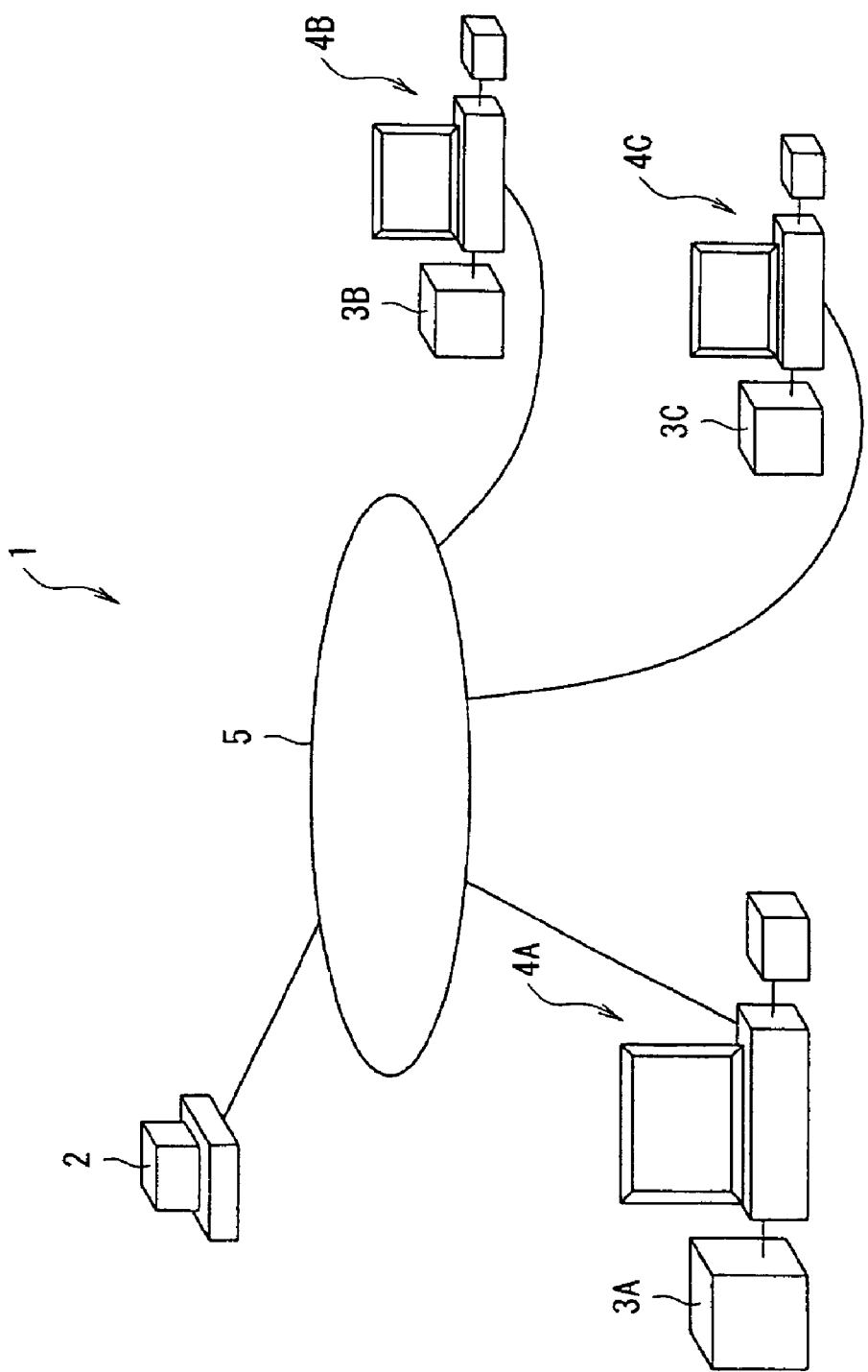
FIG. 1 is a block diagram showing an arrangement of a confidential printing system according to the present invention.

First described is an arrangement of a confidential printing system according to the invention, based on FIG. 1. FIG. 1 is a block diagram showing the confidential printing system arrangement according to the invention.

The confidential printing system 1 includes a print instructor 2 to generate a print job, instruct for printing based on a print job or so, first to third printers 3A-3C to carry out a printing with a print job, first to third print-job managers 4A-4C connected in a one-to-one relationship to and positioned close to the respective first to third printers 3A-3C in order to hold print jobs therein, display print-job information thereon or so, and a network 5 connected, to exchange data between the print instructor 2 and the print job managers 4A-4C.

Note that the first to third printers 3A-3C have functional configurations similar between those, and hence those wholly are suitably described as a printer 3 from now on.

Meanwhile, the first to third print-job managers 4A-4C have functions and configurations similar between those, and hence those wholly are suitably described as a print-job manager 4 from now on.

Figure 2:
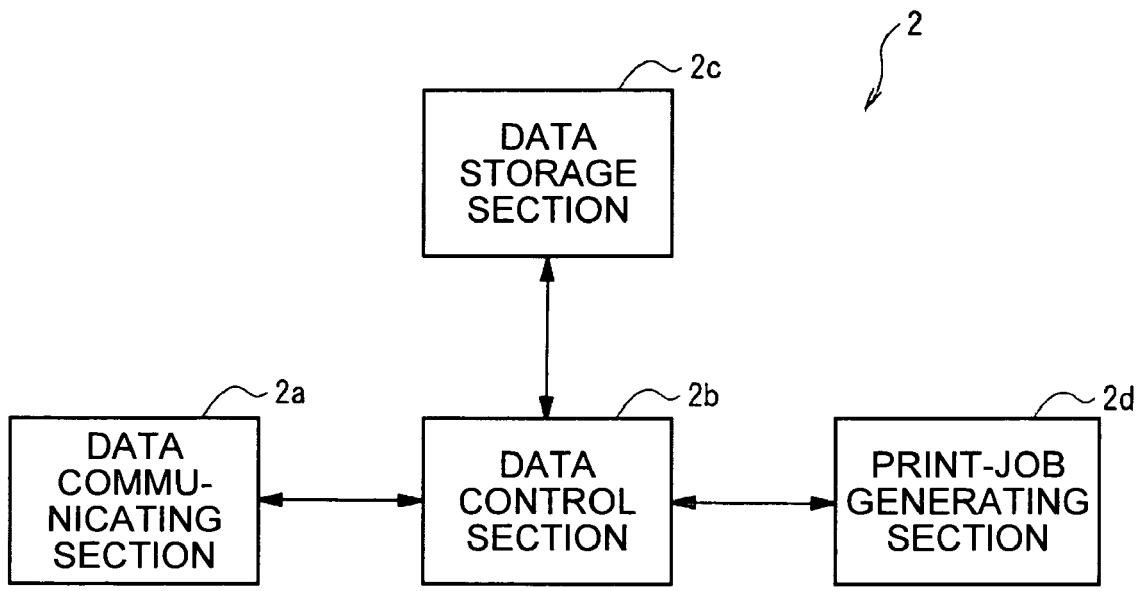
FIG. 2 is a block diagram showing a detailed functional configuration of a print instructor.

Referring to FIG. 2, the print instructor 2 is detailed in its functional configuration. FIG. 2 is a block diagram showing in detail the functional configuration of the print instructor 2.

The print instructor 2 includes a data communicating section 2a, a data control section 2b, a data storage section 2c and a print-job generating section 2d.

The data communicating section 2a has a function to send/receive data to/from the apparatuses, say, the first to third print-job managers 4A-4C, connected to the network 5, say, to send a print job to any of the printers 3A-3C through the network 5.

The data control section 2b has a function to totally control the flow of data in the print instructor 2, e.g. to store in the data storage section 2c the data acquired from an external apparatus through the data communicating section 2a, convey the various ones of data stored in the data storage section 2c to the constituent sections, control the data exchange between the constituent sections, and send the print job generated in the print-job generating section 2d to any of the first to third printers 3A-3C through the data communicating section 2a.

The data storage section 2c has a function to store the data for generating a print job, the data required in the processing at the constituent sections or the like, in addition to the document and image data generated by an editor or the like.

The print-job generating section 2d is to read out the document and image data stored in the data storage section 2c according to a print instruction from the editor, etc. and add the information about a system user who made the print-instruction to the print data thus read out, to thereby generate a print job. After generating a print job, it sends the print job to any of the first to third print-job managers 4A-4C through the data control section 2b. In this embodiment, the user who instructs for printing is assumed to desirably select a destination of print job.

The print instructor 2 has a processor, a RAM (random access memory) and a ROM (read only memory) storing an exclusive program, though not shown. By executing the exclusive program by the processor, the foregoing functions are achieved for the various sections. The sections coexistently include those the functions of which are achieved only by the exclusive program, those the functions of which are achieved by controlling the hardware through the exclusive program, and so on.

Figure 3:
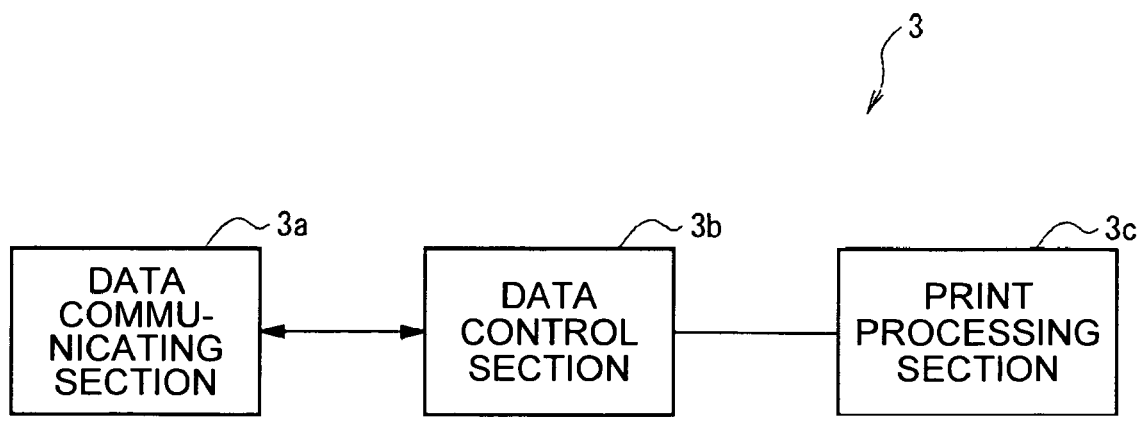
FIG. 3 is a block diagram showing s detailed functional configuration of a printer.

Referring to FIG. 3, the printer 3 is detailed in its functional configuration. FIG. 3 is a block diagram showing a detailed functional configuration of the printer 3.

The printer 3 includes a data communicating section 3a, a data control section 3b and a print processing section 3c, as shown in FIG. 3.

The data communicating section 3a has a function to exchange data with the print-job manager 4, say, receive a print job from the print-job manager 4 wiredly or wirelessly, or send the information of print result, etc. to the print-job manager 4.

The data control section 3b has a function to totally control the flow of data in the printer 3, e.g. convey the print job received from the print-job manager 4 to the print processing section 3c through the data communicating section 3a, or send the print-result information from the print processing section 3c to the print-job manager 4 through the data communicating section 3a.

The print processing section 3c has a function to make a printing of the image data, the document data or the like constituting a print job into an image, document or the like, depending upon the print job received from the print-job manager 4.

Here, the printer 3 has a processor, a RAM (random access memory) and a ROM (read only memory) storing an exclusive program, though not shown. By executing the exclusive program due to the processor, the foregoing functions are achieved for the various sections. The sections coexistently include those the functions of which are achieved only by the exclusive program, those the functions of which are achieved by controlling the hardware through the exclusive program, and so on.

Figure 4:
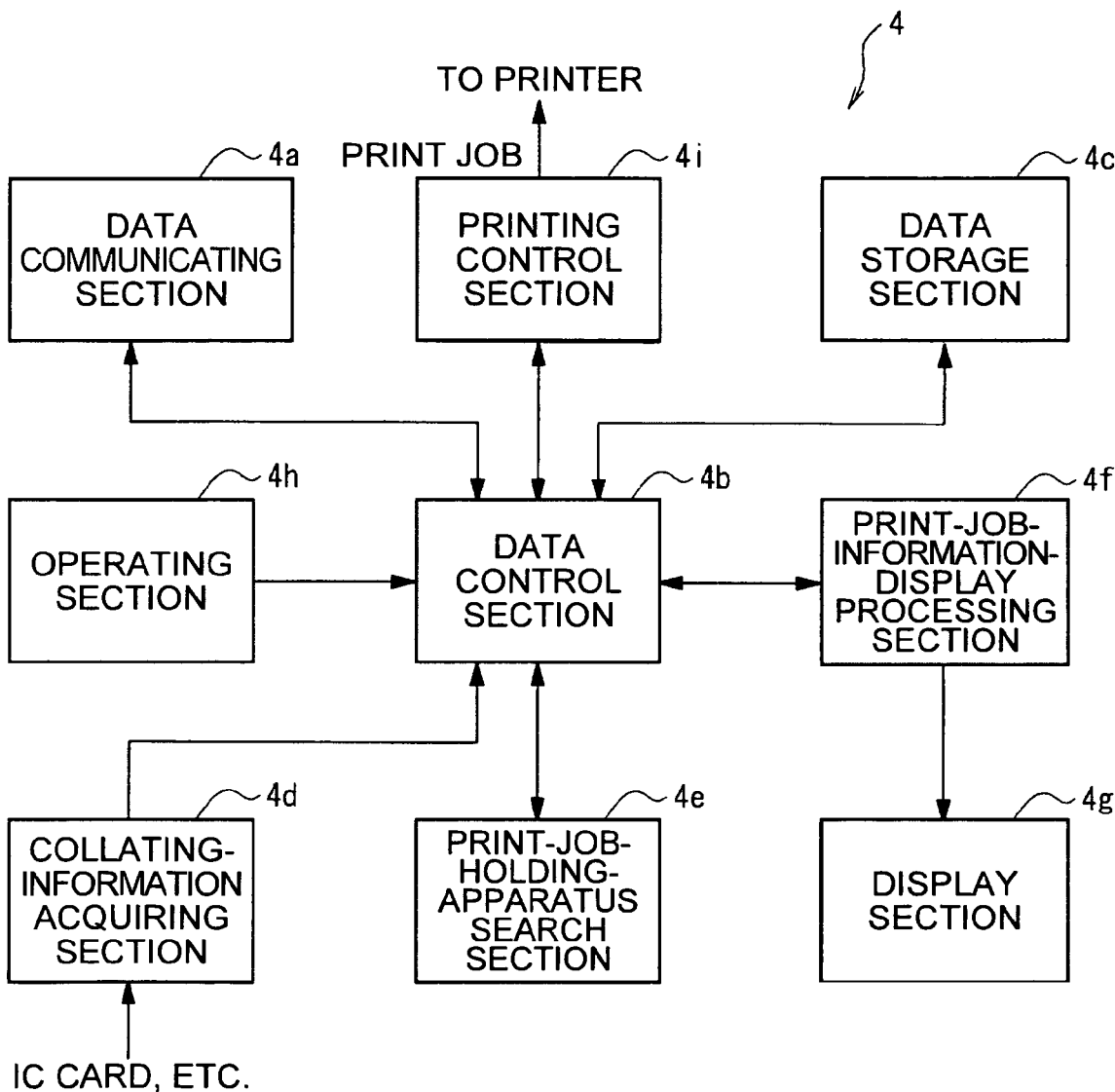
FIG. 4 is a block diagram showing a detailed functional configuration of a print-job manager.

Referring to FIG. 4, the print-job manager 4 is detailed in its functional configuration. FIG. 4 is a block diagram showing a detailed functional configuration of the print-job manager 4.

The print-job manager 4 includes a data communicating section 4a, a data control section 4b, a data storage section 4c and a collation-information acquiring section 4d, as shown in FIG. 4.

The data communicating section 4a has a function to exchange data of the own apparatus with those apparatus, such as the print instructor 2 or a print-job manager 4, connected to the network 5, say, receive a print job from the print instructor 2 through the network 5, send print-job-information request to another print-job holding apparatus (any of the first to third print-job managers 4A-4C, in FIG. 1), send the information for searching an apparatus having a print-job holding function (hereinafter, print-job holding apparatus) out of the other apparatuses connected to the network 5 to the relevant other apparatus, and receive print-job information, a print-job-information request and a print job from the print-job holding apparatus.

The data control section 4b has a function to totally control the flow of data in the print-job manager 4, say, searching a print job matched to the collating information acquired at the collation-information acquiring section 4d out of the print jobs stored in the data storage section 4c, send a request for print-job information matched to the acquired collating information to the print-job holding apparatus detected in the print-job-holding-apparatus detecting section 4g through the data communicating section 4a, convey the data received through the data communication section 4a to the constituent sections, convey the various ones of data stored in the data storage section 4c to the constituent sections, and control the data exchange between the constituent sections. Furthermore, it has a function that, depending upon the print-result information from the printer 3, the print-count information about the print job stored in the data storage section 4c is recorded in association with each piece of print-job information so that print count for the objective print job can be updated each time printing is done.

In the invention, the print-job manager 4 is arranged to save a print job completed of printing, together with the print-count information thereof, for a predetermined period of time.

The data storage section 4c has a function to store the print job received from the print instructor 2 through the data communicating section 4a, the positional information about the print-job manager 4, and the data required in the processing to execute in the constituent section.

The collating-information acquiring section 4d has a function to read the collating information of system user out of a card storage medium (IC card, etc.) the system user possesses.

The print-job manager 4 further includes a print-job-holding-apparatus search section 4e, a print-job-information-display processing section 4f, a display section 4g, an operating section 4h and a printing control section 4i, as shown in FIG. 4.

The print-job-holding-apparatus search section 4e has a function to search a print-job holding apparatus that holds a print job matched to the collating information, according to the search instruction and collating information from the data control section 4b, and forward a search result to the data control section 4b. In the present embodiment, there are two access ways in acquiring print-job information from another apparatus, i.e. (1) a method to broadcast print-job request to all the apparatuses connected to the network 5 and (2) a method to search a print-job holding apparatus out of the apparatuses connected to the network 5 and send print-job request including collating information only to the print-job holding apparatus thus detected. The system user is allowed to select a desirable method.

The print-job-information-display processing section 4f has a function to rearrange the print-job information by an rearrangement process into an order of higher possibility to print, depending upon the display instruction and print-job information from the data control section, and cause the display section 4g to display the print-job information thus rearranged.

The display section 4g is a liquid-crystal display or the like, which has a function to display a predetermined image according to an image signal from the print-job-information-display processing section 4f.

The operating section 4h has an operating section, such as an operation panel, a pointing device, a keyboard or a touch panel, so that the system user can select a desired piece of print-job information from the print-job information displayed on the display section 4g or instruct for printing or deleting the selected piece of print-job information. This has a function to forward, to the data control section 4b, the various instructions made by the system user through the operating section.

The printing control section 4i has a function as follows. Namely, when there is a print job matched to print-job information in the data storage section 4c of the own print-job manager, the printing control section 4i acquires a print job of the information from the data storage section 4c through the data control section 4b according to a print instruction to the print job information displayed on the system user's display section 4g from the data control section 4b. When there are no print jobs matched, the printing control section 4i acquires a print job matched to the print instruction from an apparatus holding the relevant print job through the data control section 4b and data communicating section 4a. Furthermore, the print job acquired is conveyed to the printer 3 where printing is made for the print job.

The network 5 is a known information communication network, such as a LAN or a WAN. The foregoing apparatuses are allowed to exchange data between the apparatuses through the network 5.

The print instructor 2 is arranged to allow the CPU to start a predetermined program stored in a predetermined domain of the ROM. According to the program, executed is a print-job transmission process shown in a flowchart of FIG. 5.

Figure 5:
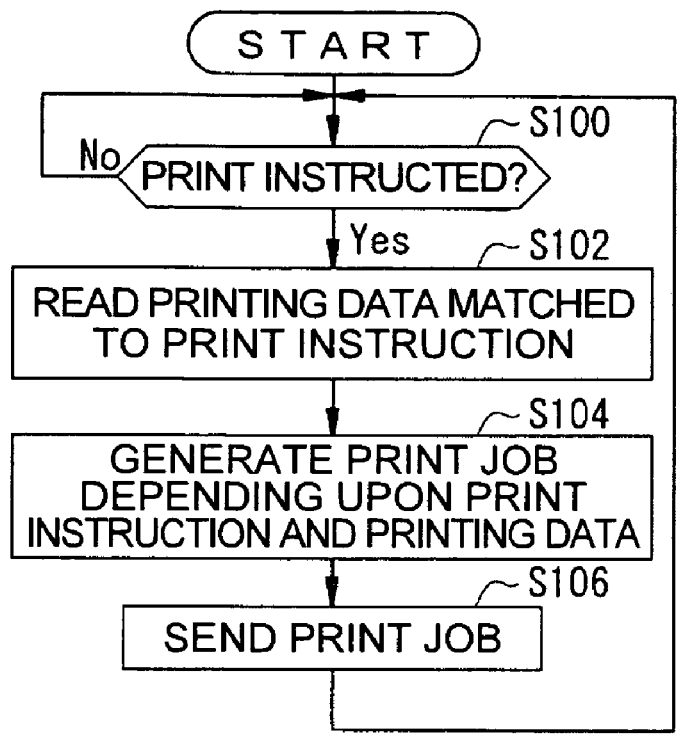
FIG. 5 is a flowchart showing a print-job transmission process at the print instructor.

FIG. 5 is a flowchart showing a print-job transmission process in the print instructor 2.

When the print-job transmission process is executed by the CPU, the process first moves to step S100 as shown in FIG. 5.

At step S100, it is determined in the data control section 2b whether or not a print instruction was made by determining whether or not received a print instruction for the data to print (hereinafter, referred to as printing data) from the editor or the like. If determined there was a print instruction (Yes), a print-job generating command is sent to the print-job generating section 2d and the process moves to step S102. If not so (No), the determination process is repeated until a print instruction comes.

Here, the print instruction information includes collating information capable of identifying the system user who have instructed for printing, information about an apparatus having a print-job holding function for which the print job is destined (IP address, MAC address, etc.).

If moved to step S102, the print-job generating section 2d reads the print data matched to the printing command information out of the data storage section 2c through the data control section 2b according to the print-job generating command from the data control section 2b, and then the process moves to step S104.

At step S104, the print-job generating section 2d generates a print job depending upon the print instruction information received at step S100 and the printing data read out at step S102, and then the process moves to step S106. Here, the print job is in a data structure the print data is added with the header information including the collating information and the information about a destination apparatus of print job that are contained in the print instruction information.

At step S106, the print job generated at step S104 is sent to the apparatus the print job is to be destined for, and the process moves to step S100.

Furthermore, the print-job manager 4 is allowed to start, by means of the CPU, a predetermined program stored in a predetermined domain of the ROM. According to the program, executed is a print-job saving process shown in a flowchart of FIG. 6.

Figure 6:
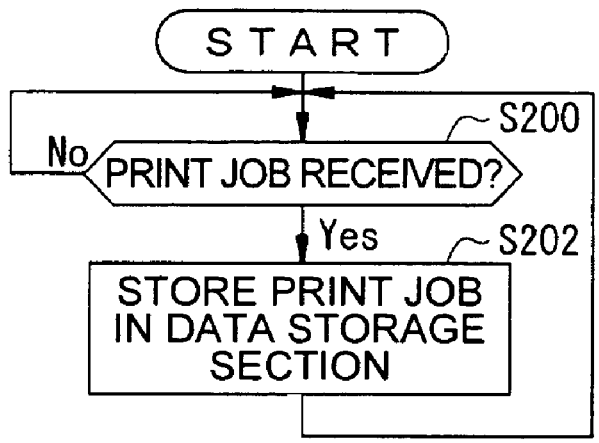
FIG. 6 is a flowchart showing a saving process in the print-job manager.

FIG. 6 is a flowchart showing a print-job saving process in the print-job manager 4.

In the case the print-job saving process is executed by the CPU, the process first moves to step S200 as shown in FIG. 6.

At step S200, the data control section 4b determines whether or not received a print job from the print instructor 2 through the data communicating section 4a. If determined received (Yes), the process moves to step S202. If not so (No), the determination process is repeated until receiving it.

If moved to step S202, the data control section 4b associates the print job received at step S200 with print-count information (initial value: print count 0) and stores it in the data storage section 4c, and then the process moves to step S200.

Meanwhile, the print-job manager 4 is allowed to start, by means of the CPU, a predetermined program stored in a predetermined domain of the ROM. According to the program, executed is a first print-job-information display process shown in a flowchart of FIG. 7.

Figure 7:
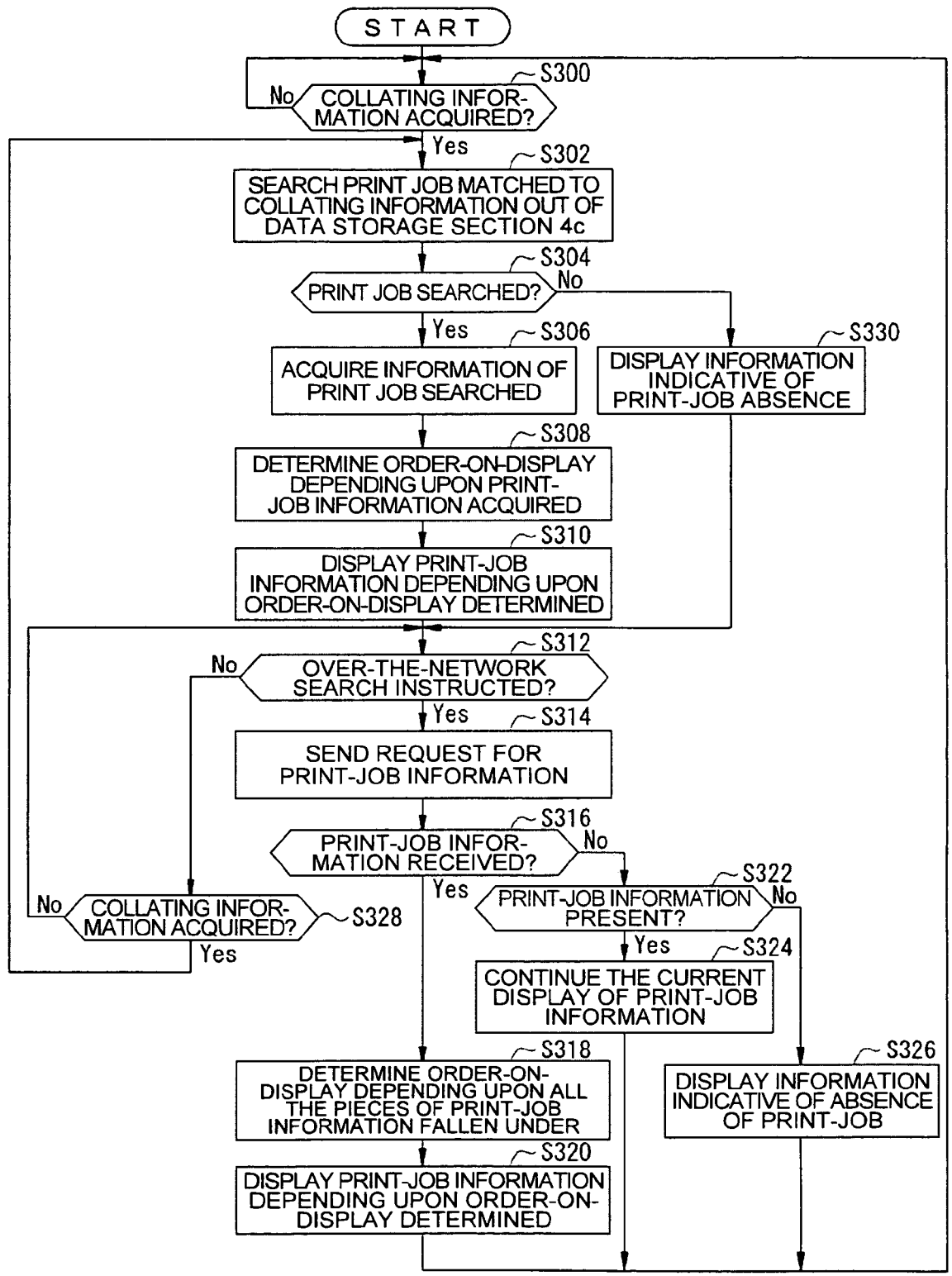
FIG. 7 is a flowchart showing a first print-job-information display process in the print-job manager.

FIG. 7 is a flowchart showing a first print-job-information display process in the print-job manager 4.

The first print-job-information display process is a process to display print-job information by use of the foregoing access way (1). If executed by the CPU, the process first moves to step S300 as shown in FIG. 7.

At step S300, the data control section 4b determines whether or not acquired collating information through the collating-information acquiring section 4d. If determined acquired (Yes), the acquired collating information is sent to the print-job holding apparatus search section 4e, and the process moves to step S302. If not so (No), the determination process is repeated until it is acquired.

If moved to step S302, the data control section 4b searches a print job matched to the collating information acquired at step S300 out of the data storage section 4c, and the process moves to step S304.

At step S304, the data control section 4b determines whether or not searched out a print job matched to the collating information. If determined searched out (Yes), the process moves to step S306. If not so (No), the process moves to step S330.

If moved to step S306, the information of the print job searched out at step S304 is acquired. The acquired print-job information is sent to the print-job-information-display processing section 4f, and then the process moves to step S308. Here, the print-job information includes the information of print-data title (file-name information), the information of print count and the information of a printer location mated to the print-job holding apparatus, etc.

At step S308, the print-job-information-display processing section 4f determines an order-on-display of the print-job information acquired from the data control section 4b, and then the process moves to step S310.

At step S310, the print-job-information-display processing section 4f causes the display section 4g to display the print job information acquired from the data control section depending upon the order-on-display determined at step S308, and then the process moves to step S312.

At step S312, the data control section 4b determines whether or not there was an over-the-network search instruction from the system user, depending upon the operating information from the operating section 4h. If determined there was a search instruction (Yes), the process moves to step S314. If not so (No), the process moves to step S328.

If moved to step S314, the print-job-holding-apparatus search section 4e broadcasts a request for the print-job information containing the collating information acquired at step S300, to all the apparatuses connected to the network 5, and then the process moves to step S316.

At step S316, the data control section 4b determines whether or not received print job information through the data communicating section 4a. If determined received (Yes), the received print-job information is sent to the print-job-information-display processing section 4f, and then the process moves to step S318. If not so (No), the process moves to step S322.

If moved to step S318, the print-job-information-display processing section 4f determines an order-on-display of all the pieces of print-job information acquired from the data control section 4b, and then the process moves to step S320.

At step S320, the print-job-information-display processing section 4f causes the display section 4g to display the acquired pieces of print-job information from the data control section, in the order-on-display determined at step S318, and the process moves to step S300.

Meanwhile, if not received print-job information at step S316 and the process moved to step S322, the print-job-information-display processing section 4f determines whether or not there is a piece of print-job information being displayed. If determined present (Yes), the process moves to step S324. If not so (No), the process moves to step S326.

If moved to step S324, the print-job-information-display processing section 4f continues to display the print-job information now being displayed, and then the process moves to step S300.

Meanwhile, if moved to step S326, the print-job-information-display processing section 4f causes the display section 4g to display the information indicative of the absence of a print job in the apparatuses connected to the network, and then the process moves to step S300.

If there is no over-the-network-search instruction at step S312 and the process moved to step S328, the data control section 4b determines whether or not acquired collating information through the collating-information acquiring section 4d. If determined acquired (Yes), the acquired collating information is sent to the print-job-holding-apparatus search section 4e, and the process moves to step S302. If not so (No), the process moves to step S312.

If not searched out a print job at step S304 and hence the process moves to step S330, the print-job-information-display processing section 4f causes the display section 4g to display information indicative of not holding a print job in the own apparatus, and the process moves to step S312.

Meanwhile, the print-job manager 4 starts a predetermined program stored in a predetermined domain of the ROM. According to the program, executed is a second print-job-information display process shown in a flowchart of FIG. 8.

Figure 8:
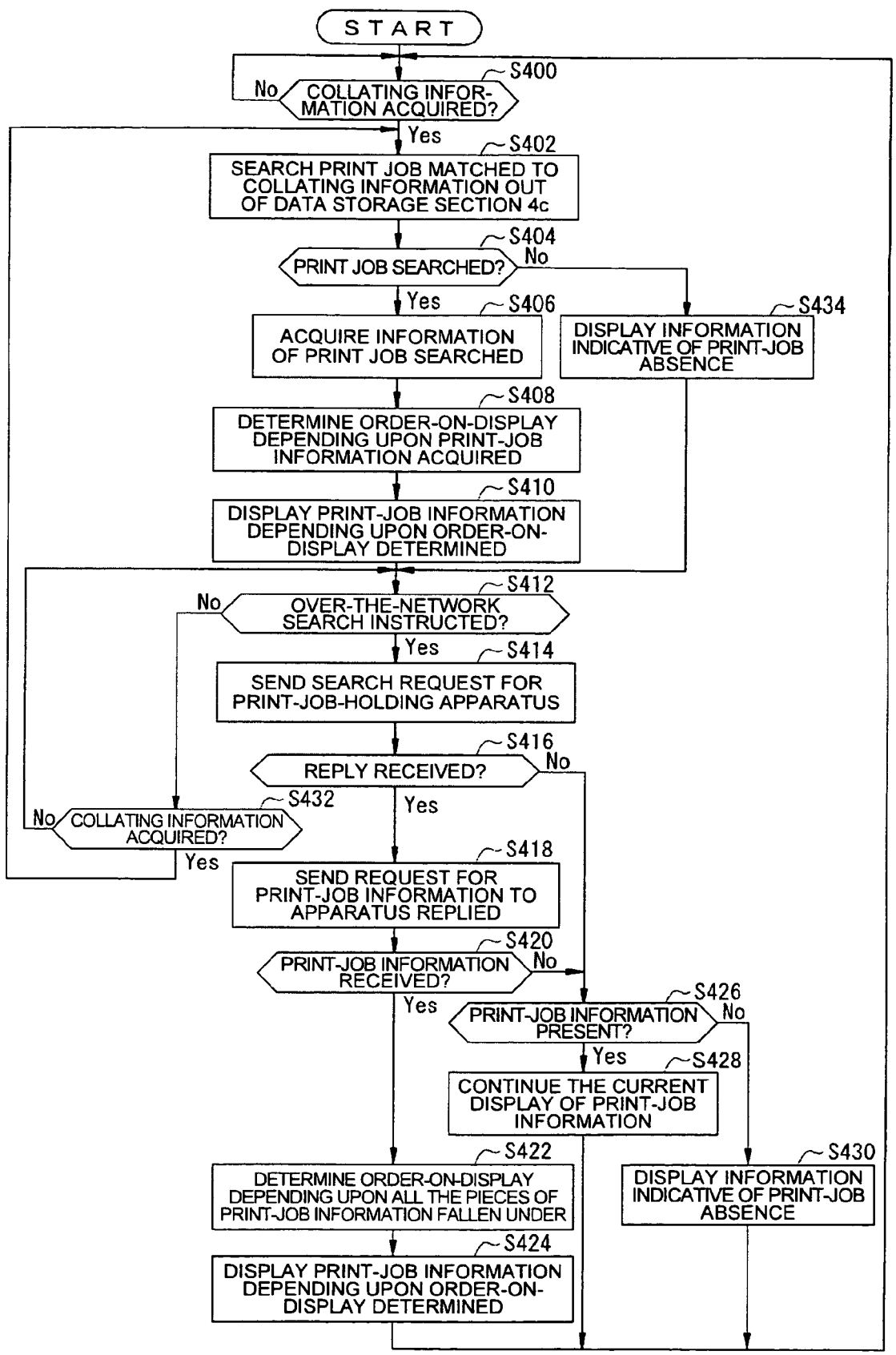
FIG. 8 is a flowchart showing a second print-job-information display process in the print-job manager.

FIG. 8 is a flowchart showing a second print-job-information display process in the print-job manager 4.

The second print-job-information display process is a process to display print-job information by use of the foregoing access way (2). If executed by the CPU, the process first moves to step S400 as shown in FIG. 8.

Here, the processes of steps S400-S412 and steps S420-S434 are similar to the processes of steps S300-S312 and steps S316-S330 respectively, and hence omitted to explain. Accordingly, the process of steps S412-S418 is described in the following.

At step S414, the print-job-holding-apparatus search section 4e broadcasts the information of search request for print-job holding apparatus to all the apparatuses connected to the network 5, and then the process moves to step S416.

At step S416, the data control section 4b determines whether or not received a reply from a print-job holding apparatus through the data communicating section 4a. If determined received (Yes), the process moves to step S418. If not so (No), the process moves to step S426.

If moved to step S418, the request for print-job information, containing the collating information acquired at step S400, is sent to the print-job holding apparatus matched to the reply received at step S416, and the process moves to step S420.

Namely, search is made for a print-job holding apparatus through all the apparatuses connected to the network 5. Then, the request for print-job information, containing the collating information, is sent only to the print-job holding apparatuses searched out.

Figure 9:
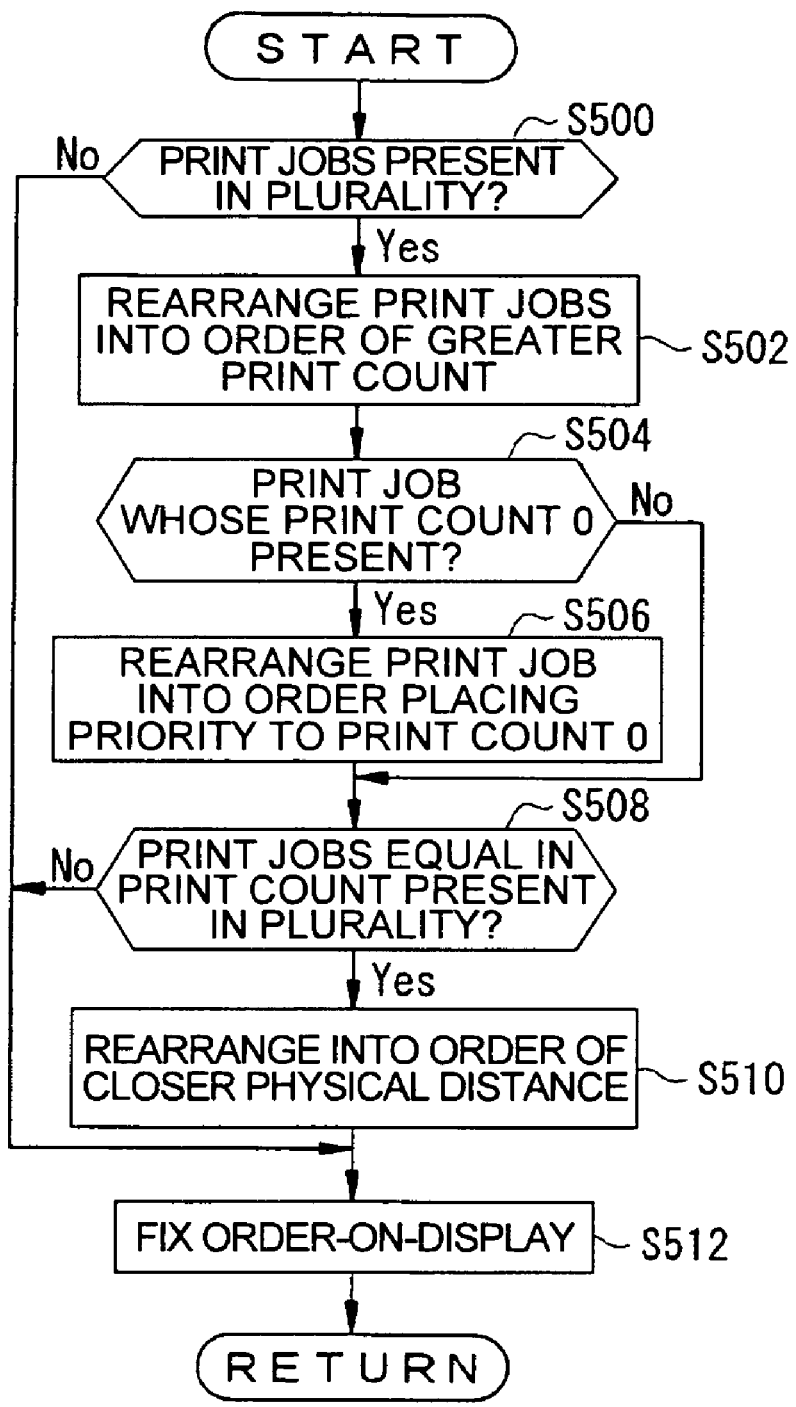
FIG. 9 is a flowchart showing an order-on-display determining process in a print-job-information-display processing section of the print-job manager.

Referring to FIG. 9, description is made in detail on the order-on-display determining process at step S310, S314, S320, S414, S418 or S424.

FIG. 9 is a flowchart showing an order-on-display determining process in the print-job-information-display processing section 4f of the print-job manager 4.

The order-on-display determining process is to determine an order-on-display of matched pieces of print-job information to the collating information. If executed at any of steps S310, S314, S320, S414, S418 and S424, the process first moves to step S500.

At step S500, it is determined whether or not there are a plurality of pieces of print-job information. If determined there are a plurality of information (Yes), the process moves to step S502. If not so (No), the process moves to step S510.

If moved to step S502, the print-job information is rearranged into an order-on-display of greater print count depending upon the print-count information contained in the print-job information, and the process moves to step S504.

At step S504, it is determined whether or not there is a piece of print-job information whose print count is "0", depending upon the print-count information. If determined present (Yes), the process moves to step S506. If not so (No), the process moves to step S508.

If moved to step S506, rearrangement is made into an order in which the print job having a print count "0" is preferentially placed to the top, and the process moves to step S508.

At step S508, it is determined whether or not there are a plurality of pieces of print-job information equal in print count. If determined there are a plurality of information (Yes), the process moves to step S510. If not so (No), the process moves to step S512.

If moved to step S510, rearrangement is made such that the print-job information, held by a print-job holding apparatus mated to another printer 3 closer in physical distance to the printer 3 mated to the own print-job manager 4, is placed to the top of those equal in print count depending upon the printer-position information contained in the print-job information, and the process moves to step S512.

At step S512, the order-on-display of print-job information at present is fixed, and the series process is terminated to return to the former process.

Furthermore, the print-job manager 4 is allowed to start, by means of the CPU, a predetermined program stored in a predetermined domain of the ROM. According to the program, executed is the first print-job search-reply process shown in a flowchart of FIG. 10.

Figure 10:
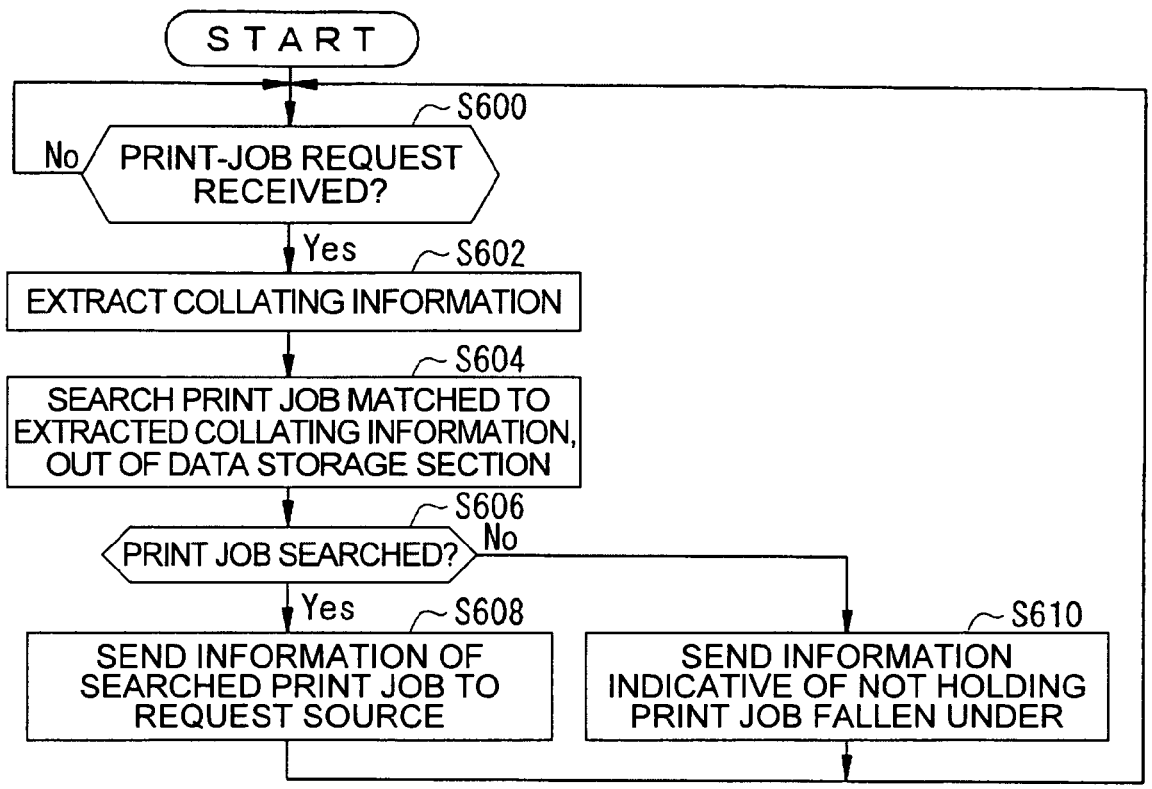
FIG. 10 is a flowchart showing a first print-job-search reply process in the print-job manager.

FIG. 10 is a flowchart showing a first print-job search-reply process in the print-job manager 4.

The first print-job search-reply process is a process corresponding to the foregoing access way (1), in the print-job-holding-apparatus search section 4e. If executed by the CPU, the process first moves to step S600 as shown in FIG. 10.

At step S600, the data control section 4b determines whether or not received print-job request through the data communicating section 4a. If determined received (Yes), the process moves to step S602. If not so (No), the determination process is repeated until print-job request is received.

If moved to step S602, the data control section 4b extracts collating information out of the print-job-information request received at step S600, and the process moves to step S604.

At step S604, the data control section 4b searches a print job, mated to the collating information extracted at step S602, out of the print jobs stored in the data storage section 4c, and the process moves to step S606.

At step S606, it is determined whether or not a print job matched to the collating information was searched out by the step S604 search process. If determined searched out (Yes), the information of the print job searched out is sent to the apparatus that requested the print-job information, and the process moves to step S600.

Meanwhile, if not searched out a print job matched to the collating information by the step S604 search process and the process moves to step S610, the information indicative of not holding a relevant print job is sent to the apparatus requested the print-job information, and the process moves to step S600.

Meanwhile, the print-job manager 4 is allowed to start, by means of the CPU, a predetermined program stored in a predetermined domain of the ROM. According to the program, executed is a second print-job search-reply process shown in a flowchart of FIG. 11.

Figure 11:
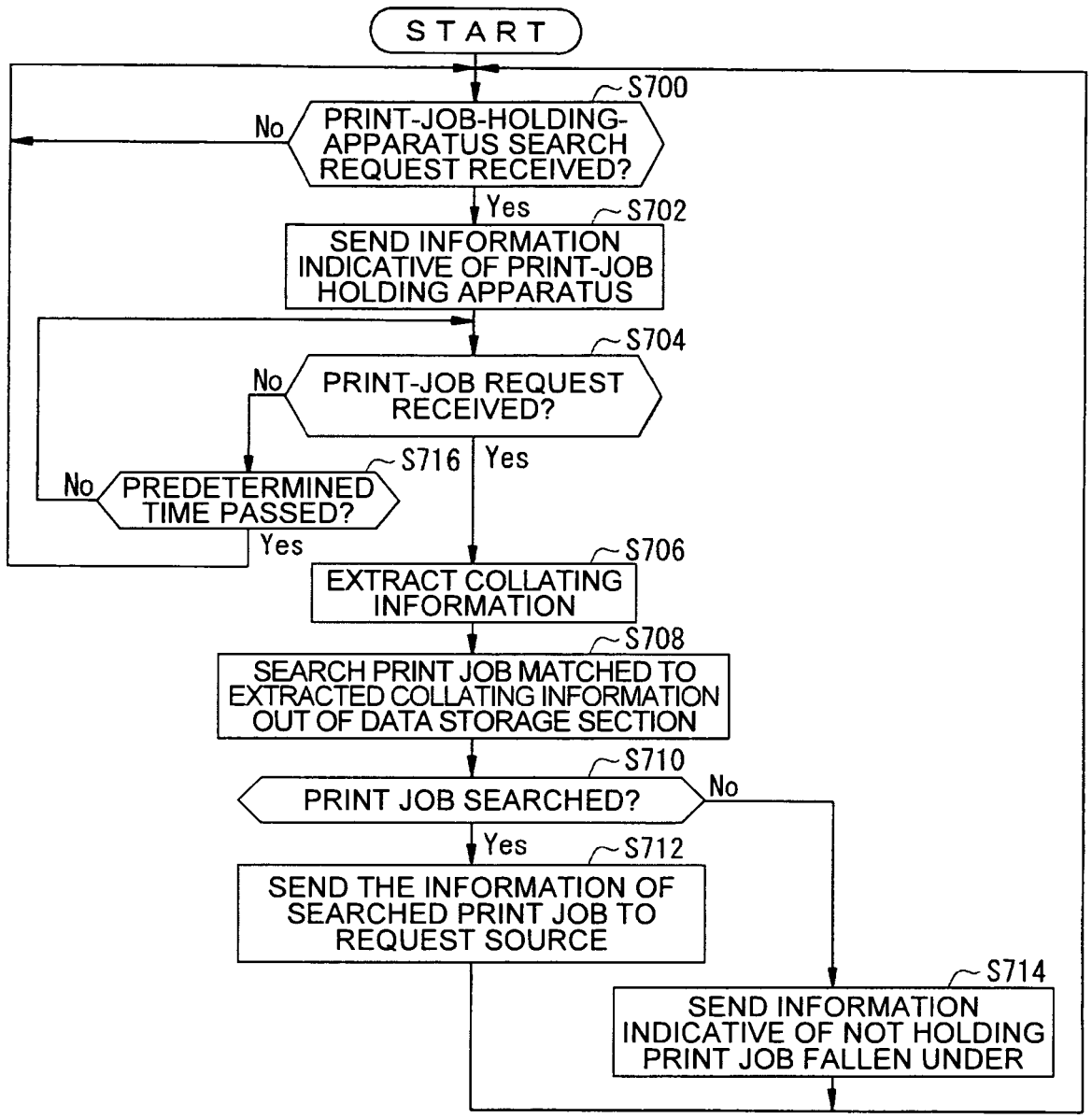
FIG. 11 is a flowchart showing a second print-job-search reply process in the print-job manager.

FIG. 11 is a flowchart showing a second print-job search-reply process in the print-job manager 4.

The second print-job search-reply process is a process corresponding to the foregoing access way (2), in the print-job-holding-apparatus search section 4e. If executed by the CPU, the process first moves to step S700 as shown in FIG. 11.

At step S700, it is determined whether or not received a print-job-holding-apparatus search request through the data communicating section 4a. If determined received (Yes), the process moves to step S702. If not so (No), the determination process is repeated until a print-job-holding-apparatus search request is received.

If moved to step S702, the data control section 4b sends the information indicating that the own is a print-job holding apparatus to the apparatus requested the searching for a print-job-holding-apparatus, and the process moves to step S704.

At step S704, the data control section 4b determines whether or not received a print-job request through the data communicating section 4a. If determined received (Yes), the process moves to step S706. If not so (No), the process moves to step S716.

If moved to step S716, the data control section 4b determines whether or not passed a predetermined time. If determined passed a predetermined time (Yes), the process moves to step S700. If not so (No), the process moves to step S704.

Here, the process of steps S706-S714 is similar to the process of steps S602-S610 of the FIG. 10 flowchart, and hence omitted to explain.

Meanwhile, the print-job manager 4 starts a predetermined program stored in a predetermined domain of the ROM. According to the program, executed is a printing/deleting process of designated print job shown in a flowchart of FIG. 12.

Figure 12:
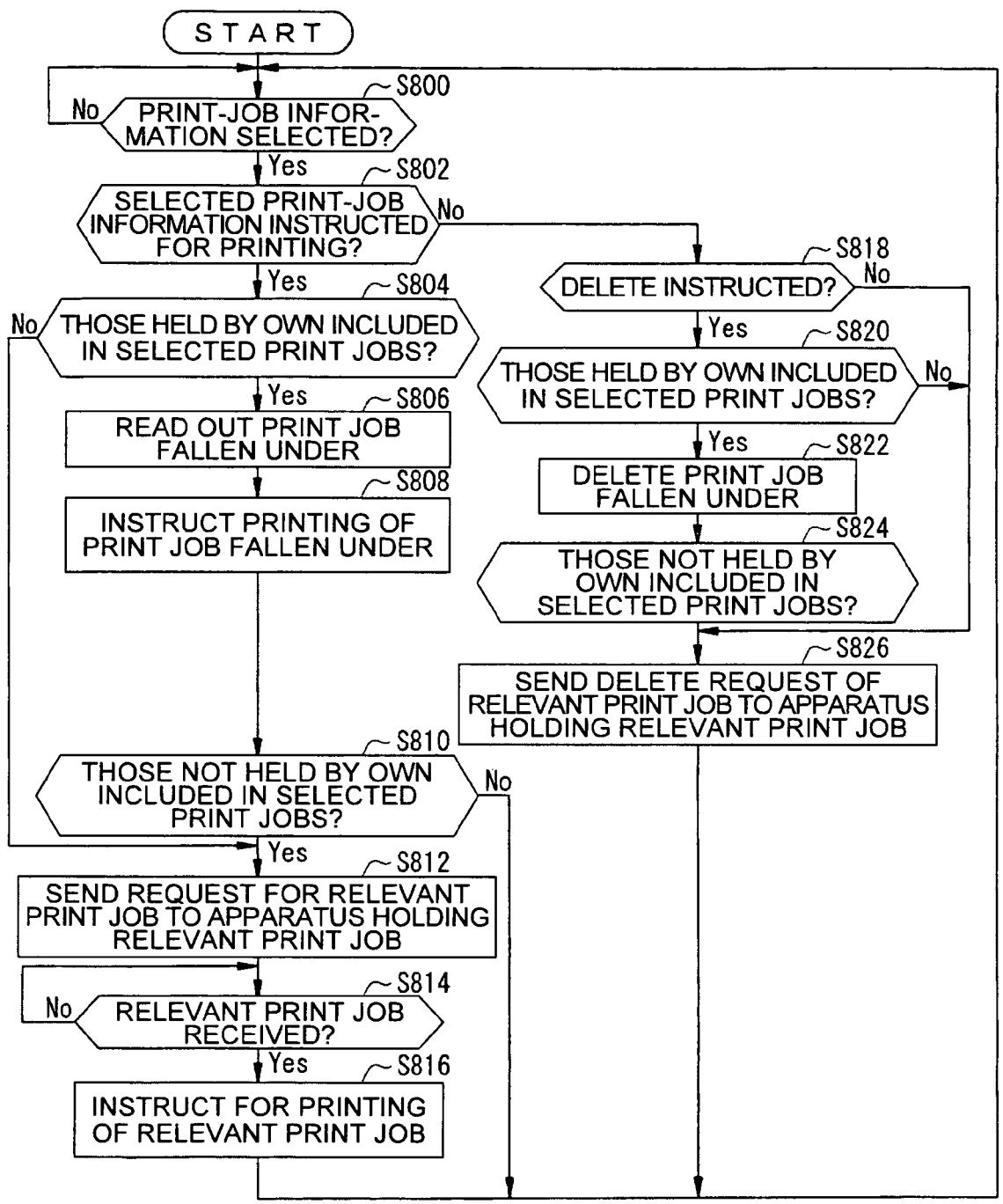
FIG. 12 is a flowchart showing a designated-print-job printing/deleting process in the print-job manager.

FIG. 12 is a flowchart showing a designated print job printing/deleting process in the print-job manager 4.

If the designated print job printing/deleting process is executed by the CPU, the process first moves to step S800 as shown in FIG. 12.

At step S800, the data control section 4b determines whether or not the system user selected print-job information out of the print-job information being displayed, depending upon the operating information from the operating section 4h. If determined selected (Yes), the process moves to step S802. If not so (No), the determination process is repeated until print-job information is selected.

If moved to step S802, the data control section 4b determines whether or not print instruction was made for a print job of the selected information depending upon the operating information from the operating section 4h. If determined print instruction was made (Yes), the process moves to step S804. If not so (No), the process moves to S818.

If moved to step S804, the data control section 4b searches through the data storage section 4c, to thereby determine whether or not there is a held one in the own apparatus of among the print jobs of the selected pieces of information at step S800. If determined present (Yes), the process moves to step S806. If not so (No), the process moves to step S812.

If moved to step S806, the data control section 4b reads a relevant print job out of the data storage section 4c and sends the relevant print job together with its print command to the printing control section 4i, and the process moves to step S808.

At step S808, the printing control section 4i sends a print request containing the print job to the printer 3 depending upon the print job and print request from the data control section 4b, and the process moves to step S810.

At step S810, the data control section 4b determines whether or not there is a print job not held in the own apparatus of among the pieces of print-job information selected at step S800. If determined present (Yes), the process moves to step S812. If not so (No), the process moves to step S800.

If moved to step S812, the data control section 4b sends a request for the relevant print job to the print-job-holding apparatus having the print job relevant to the print job held in the own apparatus, and then the process moves to step S814.

At step S814, the data control section 4b determines whether or not received the relevant print job through the data communicating section 4a. If determined received (Yes), the received print job and its print command is sent to the printing control section 4i, and the process moves to step S816.

At step S816, the printing control section 4i sends a print request containing the print job to the printer 3, depending upon the print job and its print command from the data control section 4b, and the process moves to step S810.

Meanwhile, if there was no print command for the print job of the selected piece of information and hence the process moved to step S818, the data control section 4b determines whether or not there is an instruction for deleting the print job of the selected piece of information. If determined instructed to delete (Yes), the process moves to step S820. If not so (No), the process moves to step S800.

If moved to step S820, the data control section 4b searches through the data storage section 4c to thereby determine whether or not there is a print job being held in the own apparatus of among those pieces of print-job information selected at step S800. If determined present (Yes), the process moves to step S822. If not so (No), the process moves to step S826.

If moved to step S822, the data control section 4b deletes the relevant print job from those in the data storage section 4c, and the process moves to step S824.

At step S824, the data control section 4b determines whether or not there is a print job not held in the own apparatus of among those pieces of print-job information selected at step S800. If determined present (Yes), the process moves to step S826. If not so (No), the process moves to step S800.

If moved to step S826, the data control section 4b sends a delete request of the relevant print job to the print-job holding apparatus having the print job relevant to a print job not held in the own apparatus, and the process moves to step S800.

Meanwhile, the print-job manager 4 is allowed to start, by means of the CPU, a predetermined program stored in a predetermined domain of the ROM. According to the program, executed is a printing/deleting process of designated print job shown in a flowchart of FIG. 13.

Figure 13:
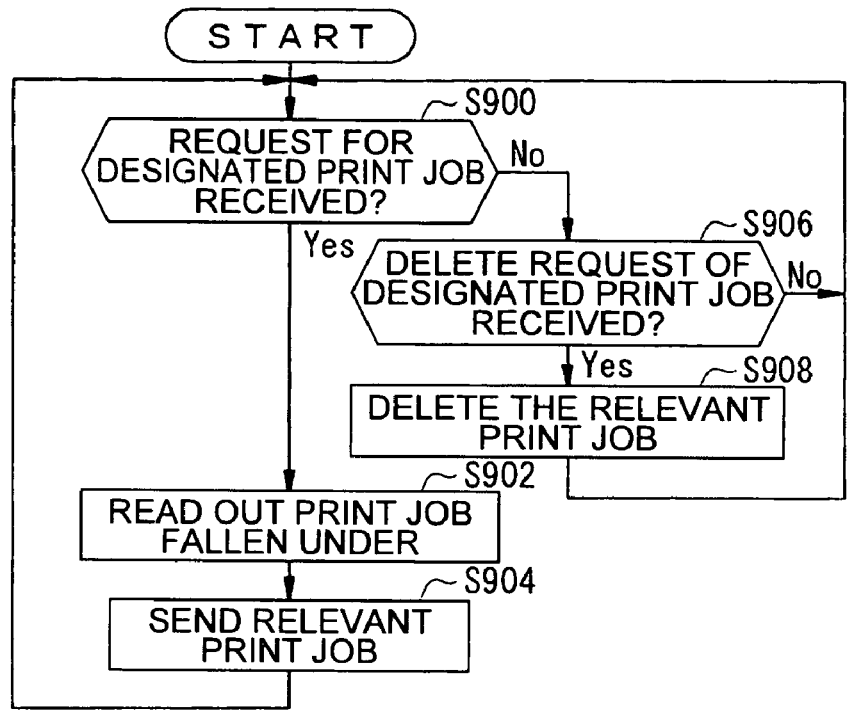
FIG. 13 is a flowchart showing a designated-print-job transmitting/deleting process in the print-job manager.

FIG. 13 is a sending/deleting process of designated print job in the print-job manager 4.

If the designated print-job sending/deleting process is executed by the CPU, the process first moves to step S900 as shown in FIG. 13.

At step S900, the data control section 4b determines whether or not received the request for a designated print-job through the data communicating section 4a. If determined received (Yes), the process moves to step S902. If not so (No), the process moves to step S906.

If moved to step S902, the data control section 4b reads from the data storage section 4c a print job corresponding to the print-job information contained in the designated-print-job request acquired at step S900, and the process moves to step S904.

At step S904, the data control section 4b sends the print job, read out at step S902, to the apparatus made the request through the data communicating section 4a, and the process moves to step S900.

Meanwhile, if not received designated-print-job request and the process moved to step S906, the data control section 4b determines whether or not received designated-print-job delete request through the data communicating section 4a. If determined received (Yes), the process moves to step S908. If not received (No), the process moves to step S900.

If moved to step S908, the data control section 4b deletes from the data storage section 4c a print job matched to the print-job information contained in the delete request, and the process moves to step S900.

Furthermore, the printer 3 is allowed to start, by means of the CPU, a predetermined program stored in a predetermined domain of the ROM. According to the program, executed is a printing process shown in a flowchart of FIG. 14.

Figure 14:
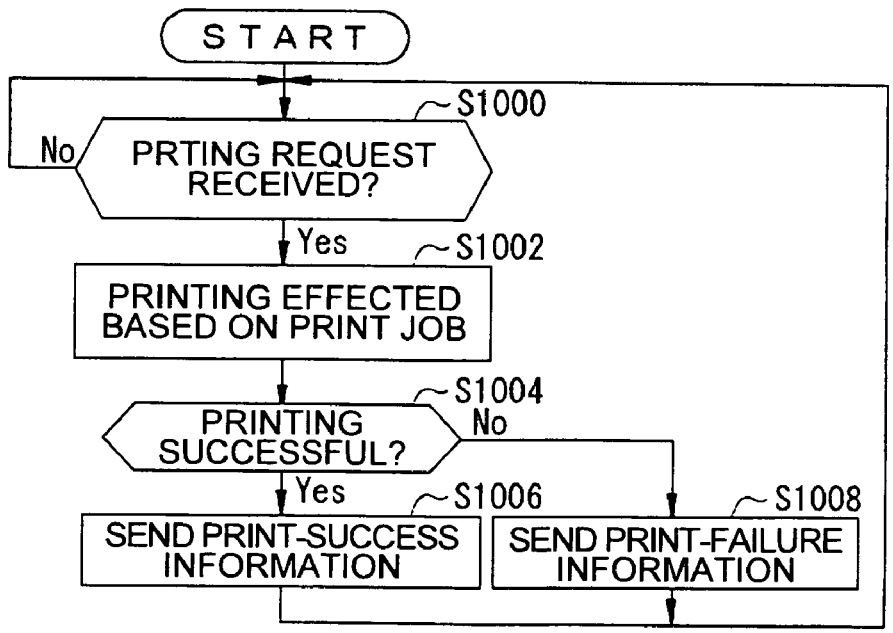
FIG. 14 is a flowchart showing a printing process in the printer.

FIG. 14 is a flowchart showing a printing process in the printer 3.

If a printing process is executed by the CPU, the process first moves to step S1000 as shown in FIG. 14.

At step S1000, the data control section 4b determines whether or not received print-request containing a print job through the data communicating section 3a. If determined received (Yes), the print job is sent to the print processing section 3c, and the process moves to step S1002. If not so (No), the determination process is repeated until it is received.

If moved to step S1002, the print processing section 3c executes a printing process of the print data depending upon the print job acquired from the data control section 3b, and the process moves to step S1004.

At step S1004, the data control section 3b determines whether or not printing was successfully done depending upon the print-result information from the print processing section 3c. If determined successful (Yes), the process moves to step S1006. If not so (No), the process moves to step S1008.

If moved to step S1006, the data control section 3b sends the information indicative of a success to the print-job manager 4 mated to the own apparatus through the data communicating section 3a, and the process moves to step S1000.

Meanwhile, if moved to step S1008, the data control section 3b sends the information indicative of a failure to the print-job manager 4 matched to the own apparatus through the data communicating section 3a, and the process moves to step S1000.

Referring to FIGS. 15 to 21, now described is the operation in the present embodiment.

Figure 17:
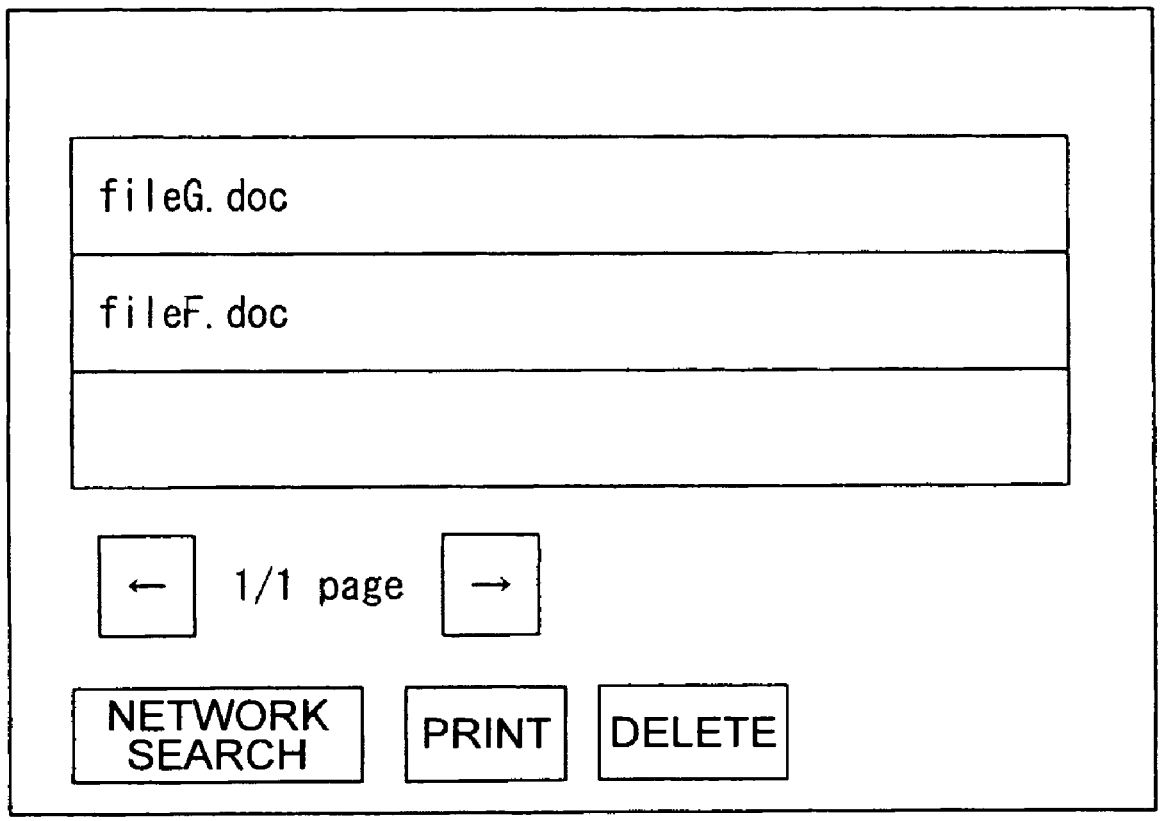
FIG. 17 is a figure showing a display example of print-job information, for a particular system user, held in the print-job manager.
Figures 19A, 19B:
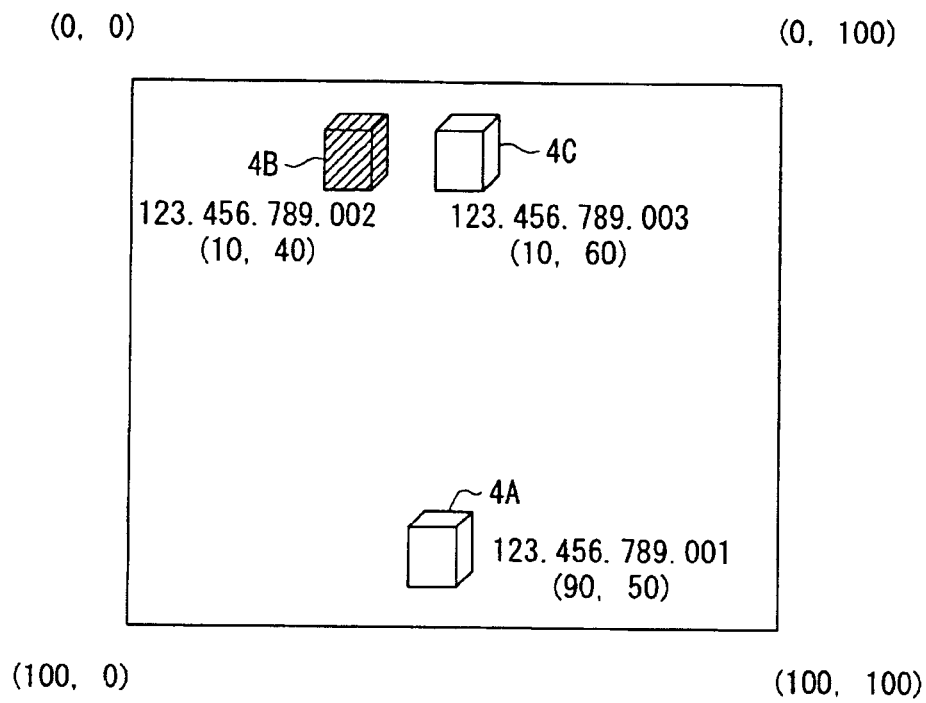
Figure 20:
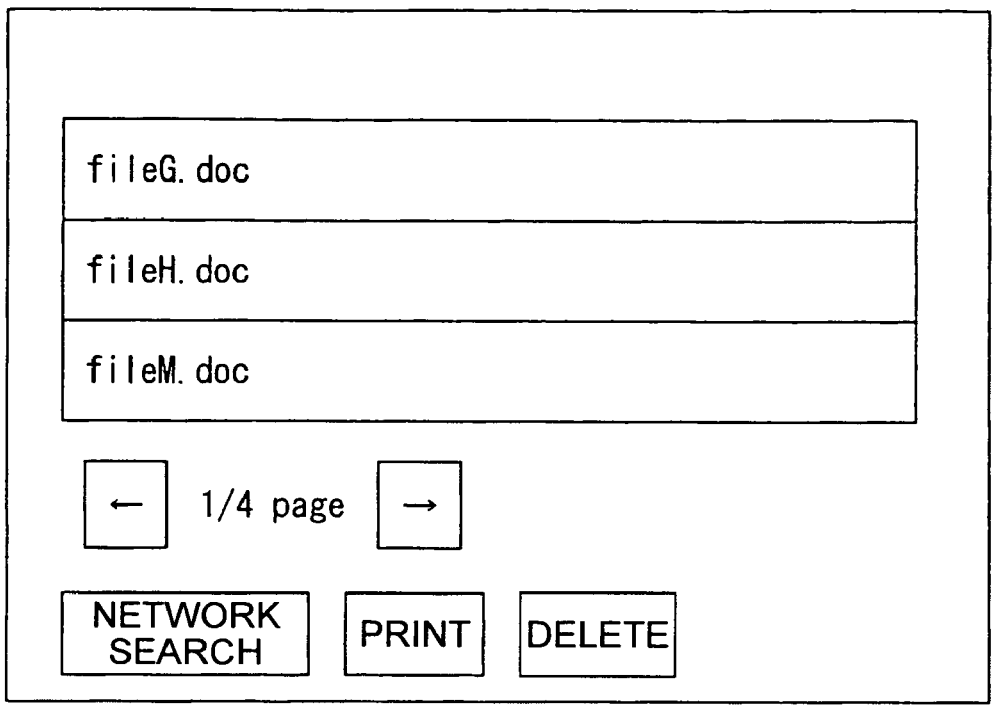
FIG. 20 is a display example of print-job information, for a particular system user, held in the first to third print-job managers.
Figure 21:
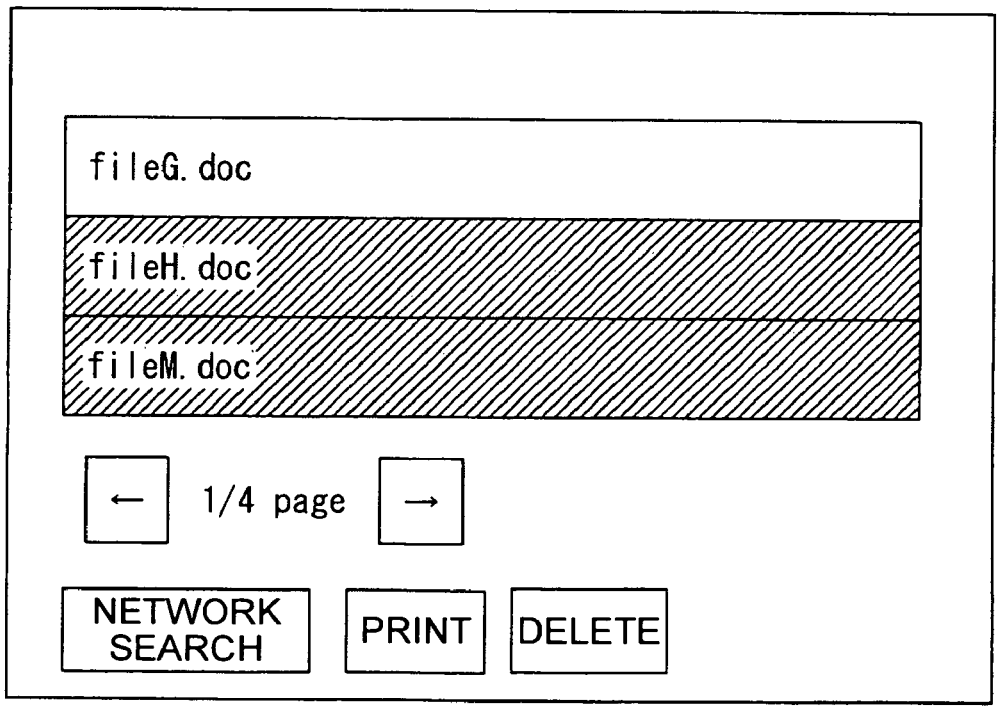
FIG. 21 is an example of print-job information in a selected state.

FIGS. 15A-15C show an example of the pieces of information of print jobs respectively held in first to third print-job managers 4A-4C. FIGS. 16A-16C show an example of the pieces of information about print jobs, for the particular system users, held respectively in first to third print-job managers 4A-4C. FIG. 17 shows a display example of print-job information, for a particular system user, held in the print-job manager 4B. FIG. 18A shows an example of an order-on-display rearranged in the order of greater print count while FIG. 18B shows an example of an order-on-display rearranged in the order by placing priority to those having a print count 0, further to the showing in FIG. 18A. FIG. 19A shows a positional relationship between the first to third print-job managers 4A-4C on a real space while FIG. 19B shows an example of an order-on-display rearranged based on the positional relationship given in FIG. 19A. FIG. 20 shows a display example of print-job information, for a particular system user, held in the first to third print-job managers 4A-4C. FIG. 21 is an example of print-job information in a selected state.

In the print instructor 2, when a print instruction is made from the system user through a document editor or the like (step S100), the print-job generating section 2d reads the print data relevant to the print instruction information from the data storage section 2c (step S102). By adding the print data with header information such as the collating information contained in the print instruction information (identification number unique to the system user (e.g. 0AB123), assumed herein) and a destination IP address of the print job (IP addresses of the first to third print-job managers 4A-4C, assumed herein), a print job is produced (step S104). The produced print job is sent to the print-job manager 4, a destination of the print job, through the data control section 2b and data communicating section 2a (step S106).

Meanwhile, when receiving the print job sent from the print instructor 2 through the data communicating section 4a (step S200), the first to third print-job manager 4A-4C at its data control section 4b stores the received print job in the data storage section 4c. In this embodiment, the print job is stored in the form of a data table that associated are such pieces of information as system-user identification number, print job name (print-data file name), print-data main body, print count and date of final printing.

In this embodiment, it is assumed that printing has been done once or a plurality of times as to at least part of the print jobs being held in the first to third print-job managers 4A-4C.

In this state, the system user causes to read an IC card, written with his/her identification number by the collating-information acquiring section 4d (card reader, herein) held by the second print-job manager 4B mated to the second printer 3B on which a print result is desired to output. Due to this, the collating-information acquiring section 4d acquires, as collating information, an identification number "0A123" for the system user B (step S300 or S400).

By thus acquiring the collating information "0A123" about the system user B, the second print-job manager 4B at its data control section 4b performs a process to search a print job matched to the collating information "0A123" out of the data storage section 4c (step S302 or S402). In this embodiment, it is assumed that the second print-job manager 4B is holding print jobs corresponding to four pieces of print-job information, as shown in FIG. 15B. Namely, in this embodiment, the print-job information is representative of print-job name (print-data file name), print count and final-printing date. Accordingly, from those four pieces of information of print jobs, two print jobs "FileF.doc" and "FileG.doc" are searched out matched to "0A123" (step S304 or S404).

In this manner, when a print job matched to the collating information is searched out, the data control section 4b acquires the information of the searched two print jobs and sends the acquired print-job information to the print-job-information-display processing section 4f (step S306 or S406). Due to this, the print-job-information-display processing section 4f performs a process to determine an order-on-display of the two pieces of print-job information depending upon the two pieces of print-job information acquired from the data control section 4b (step S308 or S408).

In the order-on-display determining process, it is first determined whether or not the print-job information acquired from the data control section 4b is present in plurality (step S500). If present in plurality, the order-on-display is rearranged depending upon the print counts. Here, because there are two pieces of print-job information, i.e. "FileF.doc" and "FileG.doc", the two print counts are compared. Because those two print counts are 12 as to "FileF.doc" and 0 as to "FileG.doc" as shown in FIG. 16B, rearrangement is first made such that "FileF.doc" greater in print count is placed to the top (step S502). Then, it is determined whether or not there is a print count 0 of among those pieces of print-job information (step S504). In the present case, because it is 0 as to "FileG.doc", rearrangement is made in a manner placing "FileG.doc" to the top (S506). Furthermore, it is determined whether or not there are a plurality of pieces of print-job information equal in print count (step S508). Here, there are nothing equal in print count at all, the order-on-display is fixed. By thus fixing the order-on-display, the print-job-information-display processing section 4f displays, on the display section 4g, the print-job information in the order-on-display thus determined. The resulting order is displayed such that "FileG.doc" is in the top followed by "FileF.doc", as shown in FIG. 17. In the present embodiment, maximally three pieces of print-job information are displayed on one screen (print-job names only are displayed here) The buttons displayed on the screen can be pushed by operating the operating section 4h. Namely, by pushing the arrow button "←" or "→", the page displayed can be changed. By pushing the "Network search" button, over-the-network search can be effected as to the print-job information. Furthermore, by selecting the print-job information displayed on the screen by operating the operating section 4h and then pushing the "Print" button, printing is effected as to the selected print-job information. While pushing the "Delete" button, the deleting process of the selected print-job information is executed.

In this manner, it is possible to display the print-job information matched to the collating information held in the second print-job manager 4B. Meanwhile, in the display process, print-job information corresponding to the print jobs not yet printed can be preferentially displayed depending upon print count. Preferential display is available for the print-job information whose print job is comparatively high for the system user to instruct for printing. The system user is allowed to search out an objective piece of print-job information more rapidly than the case not to change the order-on-display.

Description is now made on the operation of upon pushing the "Network Search" button by operating the operating section 4h by the system user B, in respect of the foregoing two access ways in the print-job-holding-apparatus search section 4e.

First described is the operation using the foregoing access way (1).

In the second print-job manager 4B, when the data control section 4b determines an instruction for over-the-network search due to pushing of the "Network Search" button ("Yes" at step S312), the print-job-holding-apparatus search section 4e sends a request for print-job information containing collating information "0A123" to the print instructor 2, first print-job manager 4A and third print job manager 4C connected to the network 5, through the data control section 4b and data communicating section 4e (step S314).

Meanwhile, the print instructor 2, when receiving the request from the second print-job manager 4B, determines the received request as not information to handle, thus discarding it.

When the first print-job manager 4A receives the request from the second print-job manager 4B (step S600), its data control section 4b performs a process to extract the collating information "0A123" from the received request (step S602) and search a print job matched to the extracted collating information out of the data storage section 4c (step S604). In this embodiment, the first print-job manager 4A is assumed holding print jobs corresponding to four pieces of print-job information, as shown in FIG. 15A. Accordingly, three print jobs, i.e. "FileA.doc", "FileC.doc" and "FileD.doc", are searched out of the four pieces of print-job information ("Yes" at step S606). After extracting the print jobs matched to the collating information "0A123", the data control section 4b acquires the information of the searched three print jobs, and sends the acquired information added with the own-apparatus information to the second print-job manager 4B, a source of the request, through the data communication section 4a.

In this embodiment, the own-apparatus information is given by an IP address of and positional information about the print-job manager 4.

Meanwhile, when the third print-job manager 4C receives the request from the second print-job manager 4B (step S600), its data control section 4b performs a search process for a print job matched to the collating information similarly to the first print-job manager 4A. In the present embodiment, the third print-job manager 4C is assumed holding seven pieces of print-job information, as shown in FIG. 15C. Accordingly, five print jobs matched to the collating information "0A123", i.e. "FileH.doc", "FileK.doc", "FileM.doc", "FileQ.doc" and "FileR.doc", are searched out of the seven pieces of print-job information ("Yes" at step S606). After searched out the print jobs matched to the collating information "0A123" in this manner, the searched five pieces of print-job information added with own-apparatus information are sent to the second print-job manager 4B, a source of request, through the data communicating section 4a.

Meanwhile, when the second print-job manager 4B receives the print-job information containing the apparatus information from the first and third print-job managers 4A, 4C (step S316), its print-job-information-display processing section 4f performs a process to determine an order-on-display of all the pieces of print-job information, depending upon all the pieces of print-job information including those pieces of print-job information searched in the own apparatus in addition to those pieces of print-job information sent from the first and third print-job managers 4A, 4C as shown in FIGS. 16A-16C (step S318).

In the order-on-display determining process, the print-job information is rearranged in order-on-display, depending upon the print count. By comparing between the print counts, rearrangement is made in the order of greater print count. Thereupon, the print-job information (print-job names, in this case) is rearranged in the order of greater print count by placing "FileQ.doc" to the top, as shown in FIG. 16A (step S502). Then, it is determined whether or not there is a print count 0 among the pieces of print-job information (step S504). Here, because "FileB.doc", "FileG.doc", "FileH.doc" and "FileM.doc" are each have a print count of 0, rearrangement is made in a manner those four pieces of print-job information are placed in the top (step S506). Furthermore, it is determined whether or not there are a plurality of pieces of print-job information equal in print count (step S508). Here, because those having a print count of 0 and of 2 exist in plurality on each. Accordingly, rearrangement is made to display the print-job information in the order preferential for the print-job holding apparatus located in a position closer in distance to the print-job holding apparatus that displays the print-job information (print-job manager 4, in this embodiment), depending upon the IP addresses of the print-job managers 4 and the physical location information, or positional information thereof, as shown in FIGS. 16A-16C. In this embodiment, a two-dimensional coordinate (x, y)=(0, 0)–(100, 100) is associatively provided to a real space where print-job managers 4 are arranged, to represent the arrangement positions of the first to third print-job managers 4A-4C in terms of a two-dimensional coordinate, as shown in FIG. 19A. Namely, the first print-job manager 4A corresponds to an IP address "123. 456. 789. 001" and coordinate (90, 50), the second print-job manager 4B to an IP address "123. 456. 789. 002" and coordinate (10, 40), and the third print-job manager 4C to an IP address "123. 456. 789. 003" and coordinate (90, 50), as shown in FIG. 19A.

Then, a distance between the second print-job manager 4B and each holding apparatus is calculated, according to the following equation (1). Based on the result of calculation, the print-job information is rearranged in order.

$$d=\{(x_2-x_1)^2+(y_2-y_1)^2\}^{1/2} \qquad (1)$$

The coordinate information is substituted in equation (1), to calculate distances between the second print-job manager 4B and the first print-job manager 4A and the third print-job manager 4C. Thereupon, the distance between the second print-job manager 4B and the first print-job manager 4A is calculated as "94", the distance between the second print-job manager 4B and the second print-job manager 4B is as "0" (the distance is calculated as "0" since the function as a holding apparatus is held), and the distance between the second print-job manager 4B and the third print-job manager 4C is as "50".

Accordingly, the own apparatus 4B is the closest to the second print-job manager 4B, the third print-job manager 4C is the next closest, and the first print-job manager 4A is the least close to it.

After calculating the distances in this manner, the print-job-information-display processing section 4f rearranges the print-job information in a manner to display those in the order of closer distance of among those equal in print count, as shown in FIG. 19B. For example, noticing the print-job information whose print count is 0, the second topped "FileG.doc" in the FIG. 18B rearrangement result is rearranged to the top in a manner giving the highest order-on-display because its print job is held by the second print-job manager 4B located closest in distance. Similarly, "FileB.doc", held by the first print-job manager 4A located most distant, is rearranged to the lowest among the print-job information whose print count is 0. After completing the rearrangement based on physical arrangement position, the order-on-display is fixed.

When the order-on-display is determined in this manner, the print-job-information-display processing section 4f displays on the display section 4g the print-job information in the order-on-display thus fixed. This results in display in an arrangement that "FileG.doc" is placed in the top followed by "FileH.doc", which is followed by "FileM.doc", as shown in FIG. 20. Each time pushing the "→" button displayed on the screen, the print-job information is displayed three a time in the order-on-display thus fixed.

In this manner, the print-job information can be displayed that is matched to the collating information held in all the apparatuses having print-job-hold function (first to third print-job managers 4A-4C) connected to the network 5. In the display process, the information whose print job is not yet printed is displayed preferentially the most depending upon print count and distance between the apparatus display-processing a print job and the apparatus having a print-job-hold function, wherein, as for those equal in print count, the closest one in the distance is displayed preferentially in the order. This makes it possible to display preferentially the piece of print-job information comparatively higher in possibility for the system user to make a print instruction. Thus, the system user is allowed to search out an objective piece of print-job information with rapidity.

Description is now made on the operation using the foregoing access way (2).

In the second print-job manager 4B, when the data control section 4b determines that there was an over-the-network search due to pushing of the "Network Search" button ("Yes" at step S412), the print-job-holding-apparatus search section 4e sends a search request for print-job holding apparatus to the print instructor 2, first print-job manager 4A and third print-job manager 4C connected to the network 5 (step S414).

Meanwhile, receiving the search request from the second print-job manager 4B, the print instructor 2 discards the received search request instead of replying an answer in this embodiment because the own apparatus is not a print-job holding apparatus.

When the first print-job manager 4A receives the search request from the second print-job manager 4B (step S700), its data control section 4b sends a reply indicative of a print-job holding apparatus to the second print-job manager 4B through the data communicating section 4a because the own apparatus is fallen under a print-job holding apparatus (step S702). In this embodiment, the reply indicative of a print-job holding apparatus is assumed information containing an IP address of the own apparatus.

When the third print-job manager 4C receives the search request from the second print-job manager 4B (step S700), its data control section 4b sends a reply indicative of a print-job holding apparatus to the second print-job manager 4B through the data communicating section 4a, similarly to the first print-job manager 4A (step S702).

When the second print-job manager 4B receives the reply containing an IP address from the first print-job manager 4A and third print-job manager 4C (step S416), it sends, in response to the reply, a request for print-job information containing collating information "0A123" to the first and third print-job managers 4A, 4C through the data control section 4b and data communicating section 4a (step S418).

The subsequent process is similar to the foregoing operation using the access way (1), and hence omitted to explain.

Description is now made on the operation in the case that, as shown in FIG. 21, "FileH.doc" and "FileM.doc" are selected out of the print-job information displayed on the screen of the display section 4g by system user B's operation to the operating section 4h, followed by pushing the "Print" or "Delete" button.

First described is the operation in the case the "Print" button is pushed. When the data control section 4b of the second print-job manager 4B determines a selection of "FileH.doc" and "FileM.doc" depending upon the operation information from the operating section 4h ("Yes" at step S800) and further a print instruction for the selected pieces of print-job information depending upon the operation information by pushing the "Print" button ("Yes" at step S802), the print jobs of the selected pieces of information are not held in the second printer 4B ("No" at step S804). A request for those print jobs is sent to the print-job manager 4 holding "FileH.doc" or "FileM.doc" (step S812). Here, because "FileH.doc" and "FileM.doc" are both held by the third print-job manager 4C as shown in FIG. 16C, the data control section 4b of the second print-job manager 4B sends a request for "FileH.doc" and "FileM.doc" to the third print-job manager 4C through the data communicating section 4a.

Meanwhile, when the third print-job manager 4C receives the request for "FileH.doc" and "FileM.doc" from the second print-job manager 4B ("Yes" at step S900), its data control section 4b reads relevant print jobs "FileH.doc" and "FileM.doc" out of the data storage section 4c (step S902), and sends the read-out print jobs to the second print-job manager 4B as a source-of-request through the data communicating section 4a (step S904).

When the second print-job manager 4B receives the print jobs "FileH.doc" and "FileM.doc" from the third print-job manager 4C ("Yes" at step S814), its printing control section 4i sends the print request containing the received print jobs to the second printer 3B mated to the second print-job manager 4B (step S816).

When the second printer 3B receives the print-request containing the print jobs "FileH.doc" and "FileM.doc" from the second print-job manager 4B (step S1000), its print processing section 3c performs a printing of the print jobs "FileH.doc" and "FileM.doc" (step S1002). When the printing is completed without any trouble, print-success information indicative of a print success is sent to the second print-job manager 4B through the data communicating section 3a. However, if the printing is unsuccessful, print-failure information indicative of an unsuccessful printing is sent to the second print-job manager 4B through the data communicating section 3a.

In brief, the system user is allowed to make a print instruction of a desired piece of print-job information displayed on the screen. For the print job being held by the print-job managers 4, he/she can simply make a print instruction at the print-job manager 4 displaying the print-job information without going to the apparatuses, and acquires a print result at the printer 3 mated to the relevant print-job manager 4.

The second print-job manager 4B, when received the print-success information from the second printer 3B, increases one the print count of each of the print jobs "FileH.doc" and "FileM.doc", thus updating the print-job information. Furthermore, the print-success information is also sent to the third print-job manager 4C holding print jobs "FileH.doc" and "FileM.doc", to update the print count in the third print-job manager 4C.

Description is now made on the operation in the case the "Delete" button is pushed.

When the data control section 4b of the second print-job manager 4B determines a selection of "FileH.doc" and "FileM.doc" depending upon the operation information from the operating section 4h ("Yes" at step S800) wherein it is further determined that a delete instruction has been made of the selected pieces of print-job information depending upon the operation information due to pushing of the "Delete" button ("Yes" at step S818), a delete request of those print jobs is sent to the third print-job manager 4C holding "FileH.doc" or "FileM.doc" (step S826) because selected pieces of print job information, in any, are not held in the second printer 4B ("No" at step S820).

Meanwhile, when the third print-job manager 4C receives the delete request of deleting "FileH.doc" or "FileM.doc" from the second print-job manager 4B ("Yes" at step S906), its data control section 4b deletes relevant print jobs "FileH.doc" or "FileM.doc" from the data storage section 4c (step S908).

Namely, the system user is allowed to make a delete instruction of a desired piece of print-job information displayed on the screen. For the print job being held by the print-job managers 4, he/she can make a delete instruction of a print job at the print-job manager 4 displaying the print-job information without going to those apparatuses. Thus, print jobs can be simply deleted from the print-job managers 4.

In the embodiment, the collating-information acquiring section 4*d* corresponds to the collating information acquiring section in any one of forms 1, 4, 11, 40 and 41. The print-job storing process due to the data control section 4*b* and data storage section 4*c* corresponds to the print-job holding section in any one of forms 1, 2, 3, 4, 11, 18, 19, 28, 41 and 48. The print-job-information acquiring process due to the data control section 4*b* and print-job-holding-apparatus search section 4*e* corresponds to the print-job-information acquiring section in any one of forms 1, 4, 11, 40 and 41. The print-count-information (contained in print-job information) acquiring process due to the data control section 4*b* and print-job-holding-apparatus search section 4*e* corresponds to the print-count-information acquiring section in form 46 or 47. The positional information (contained in print-job information) acquiring process due to the data control section 4*b* and print-job-holding-apparatus search section 4*e* corresponds to the positional-relationship information acquiring section in form 48. The print-job information display process due to the print-job-information-display processing section 4*f* and display section 4*g* corresponds to the print-job-information display section in any one of forms 1, 4, 11, 13, 14, 15, 16, 17, 18, 40, 41, 43, 44, 45, 46, 47 and 48. The process of selecting print-job information screen-displayed and causing the printer to perform a printing thereof due to the data control section 4*b* and printing control section 4*i* corresponds to the print-job-information selecting section and printing section in form 13 or 43. The process of selecting and deleting the print-job information screen-displayed due to the operating section 4*h*, data control section 4*b* and printing control section 4*i* corresponds to the print-job-information selecting section and printing-job deleting section in form 14 or 44. The process of searching a print job matched to the collating information out of the print jobs stored in the data storage section 4*c*, in the data control section 4*b*, corresponds to the print-job search section in form 41.

In the embodiment, the step S200, S202 corresponds to the print-job holding step in any one of forms 2, 3, 19, 26, 28, 35, 50, 57, 60 and 67. The step S300, S400 corresponds to the collating-information acquiring step in any one of forms 2, 3, 19, 28, 49, 50, 59 and 60.

Meanwhile, in the embodiment, the steps S302-S306 and S314-S316, the steps S402-S406 and S414-S420 and the steps S606-S608 correspond respectively to the print-job-information acquiring step in any one of forms 2, 3, 19 and 28, the print-count-information acquiring step in any one of forms 24, 25, 33 and 34 and the positional-relationship-information acquiring step in form 26 or 35. The steps S600-S604 and S704-S708 correspond to the print-job search step in form 50 or 60.

Meanwhile, in the embodiment, the steps S302-S306 and S314-S316 and the positional-relationship-information acquiring steps S402-S406 and S414-S420 correspond to the print-job-information acquiring step in any one of forms 20, 29, 49, 50, 51, 59, 60 and 61, print-count-information acquiring step in any one of forms 55, 56, 65 and 66 and positional-relationship-information acquiring step in form 57 or 67.

In the embodiment, the steps S308-S310 and S318-S326 and the steps S408-S410 and S422-S430 correspond to the print-job-information display step in any one of forms 2, 3, 19, 21, 22, 23, 24, 25, 26, 28, 30, 31, 32, 33, 34, 35, 49, 50, 52, 53, 54, 55, 56, 57, 59, 60, 62, 63, 64, 65, 66 and 67.

In the embodiment, the step S712, S714 corresponds to the print-job-information transmitting step in form 50 or 60.

In the embodiment, the step S800 corresponds to the print-job-information selecting step in any one of forms 21, 22, 30, 31, 52, 53, 62 and 63. The steps S802-S816 and the steps S900-S904 correspond to the printing step in any one of forms 21, 30, 52 and 62. The steps S818-S826 and the steps S906-S908 correspond to the print-job deleting step in any one of forms 22, 31, 53 and 63.

In the embodiment, the print-job manager 4 had the print-job holding function, the print-job-information display function (including all the functions required for display, e.g. search function), and the print-job-information selecting and process-instructing function (print-job information selection, and print instruction and deleting instruction for print-job information) wherein the print-job managers 4 and the printers 3 are mated in a one-to-one relationship. Without limited to the above, it may be 1. in a structure that the printer 3 has a similar function to the print-job manager 4 wherein the printer 3 and the print-job manager 4 are integrated together, 2. in a structure including apparatuses provided separate from or common form to the printer 3 and having the print-job holding function in the print-job manager 4 (provided corresponding to the printer 3 in a one-to-one or one-to-N relationship (N is an integer smaller than the number of the printers 3) when separate from the printer 3) and apparatuses in the number less than or equal to those apparatuses and having the print-job-information display function and print-job-information selecting and process-instructing function in the print-job manager 4, 3. in a structure that the print instructor 2 has a print-job-holding function in the print-job manager 4 wherein the print instructor 2 and printer 3 are provided in one-to-one or one-to-N (N is an integer smaller than the number of the printers 3), or 4. in another structure, e.g. a system structure that the apparatuses 1.-3. are coexistent.

In the structure 1.-3., those integrated, from the separated ones in the confidential printing system 1, are similar in basic operation to the embodiment excepting in that the data exchange, performed with the external apparatus in the embodiment, is executed internally. Meanwhile, those separated, from the integrated ones in the confidential printing system 1, are similar in basic operation to the embodiment excepting in that the data exchange, performed internally, is executed with the external apparatus.

In the structure 1., the collating-information acquiring section 4*d* corresponds to the collating-information acquiring section in any one of forms 1, 4 and 69, the print-job storing process due to the data control section 4*b* and data storage section 4*c* to the print-job holding section in any one of forms 1, 4, 68, 69 and 76, the print-job information acquiring process due to the data control section 4*b* and print-job-holding-apparatus search section 4*e* to the print-job-information acquiring section in any one of forms 1, 4, 69 and 70, the print-count-information (contained in print-job information) acquiring process due to the data control section 4*b* and print-job-holding-apparatus search section 4*e* to the print-count-information acquiring section in form 74 or 75, the positional-information (contained in print-job information) acquiring process due to the data control section 4*b* and print-job-holding-apparatus search section 4*e* to the positional-relationship-information acquiring section in form 76, the print-job-information display process due to the print-job-information-display processing section 4*f* and display section 4*g* to the print-job-information display section in any one of forms 1, 4, 69, 71, 72, 73, 74, 75 and 76, the process of selecting print-job information displayed on the screen and causing the printer to execute a printing thereof due to the operating section 4*h*, data control section 4*b* and printing control section 4*i* to the print-job-information selecting section and printing section in form 13 or 71, the process of selecting and deleting print-job information displayed on the screen due to the operating section 4h, data control section 4b and printing control section 4i to the print-job-information selecting section and print-job deleting section in form 14 or 72, and the process, in the data control section 4b, of searching a print job matched to the collating information out of the print jobs stored in the data storage section 4c to the print-job search section in form 68 or 69.

Meanwhile, in the structure 1., the step S200, S202 corresponds to the print-job holding step in any of forms 67, 77, 78, 85, 87, 88 and 95 while the step S300, S400 corresponds to the collating-information acquiring step in form 78 or 88.

In the structure 1., the steps S302-S306 and S314-S316, the steps S402-S406 and S414-S420 and the steps S606-S608 correspond to the print-job-information acquiring step in any one of form 78, 79, 88 and 89, the print-count-information acquiring step in any one of forms 83, 84, 93 and 94, and the positional-relationship-information acquiring step in form 85 or 95. The steps S600-S606 and S704-S708 correspond to the print-job search step in any one of form 77, 78, 87 and 88.

In the structure 1., the steps S302-S306 and S314-S316 and the steps S402-S406 and S414-S420 correspond to the print-job-information acquiring step in any one of form 78, 79, 88 and 89.

In the structure 1., the steps S308-S310 and S318-S326 and the steps S408-S410 and S422-S430 correspond to the print-job-information display step in any one of form 78, 80, 81, 82, 83, 84, 85, 88, 90, 91, 92, 93, 94 and 95.

In the structure 1., the step S712, S714 corresponds to the print-job-information transmitting step in any one of forms 77, 78, 87 and 88.

In the structure 1., the step S800 corresponds to the print-job-information selecting step in any one of forms 80, 81, 90 and 91. The steps S802-S816 and S900-S904 correspond to the printing executing step in form 80 or 90. The steps S818-S826 and S906-S908 correspond to the print-job deleting step in form 81 or 91.

Meanwhile, in the structure 2., the print-job storing process due to the data control section 4b and data storing section 4c corresponds to the print-job holding section in any one of forms 1, 4, 5, 6 and 68. The process, in the data control section 4b, of searching a print job, relevant to the collating information from the print job stored in the data storing section 4c corresponds to the print-job search section in any of forms 5, 6, 8, 9 and 68.

In the structure 2., the step S200, S202 corresponds to the print-job holding step in form 77 or 87.

In the structure 2., the steps S600-S604 and S704-S708 correspond to the print-job search step in form 77 or 87.

In the structure 2., the step S712, S714 corresponds to the print-job-information transmitting step in form 77 or 87.

Meanwhile, in the structure 3., the collating-information acquiring section 4d corresponds to the collating-information acquiring section in form 7 or 8, the print-job storing process due to the data control section 4b and data storing section 4c corresponds to the print-job holding section in any one of form 1, 4 and 7, the print-job-information acquiring process due to the data control section 4b and print-job-holding-apparatus search section 4e corresponds to the print-job-information acquiring section in form 7 or 8, the print-job-information display process due to the print-job-information-display processing section 4f and display section 4g corresponds to the print-job-information display section in any one of forms 7, 13, 14, 15, 16, 17 and 18, the process of selecting print-job information displayed on the screen and causing the printer to execute a printing due to the data control section 4b and printing control section 4i corresponds to the print-job-information selecting section and printing executing section in form 13, the process of selecting and deleting print-job information displayed on the screen due to the operating section 4h, data control section 4b and printing control section 4i corresponds to the print-job-information selecting section and print-job-information deleting section in form 14, and the process, in the data control section 4b, of searching a print job matched to the collating information out of the print jobs stored in the data storage section 4c corresponds to the print-job search section in any one of forms 7, 8 and 9.

Figure 22:
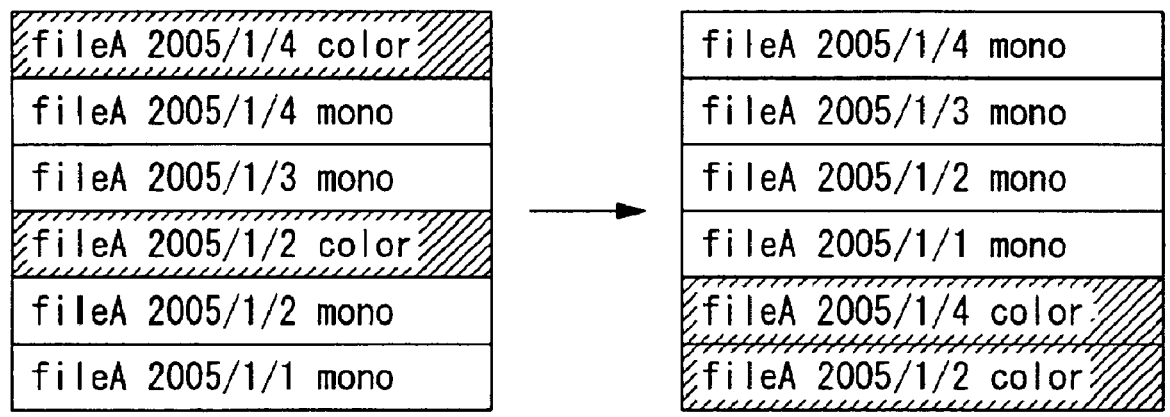
FIG. 22 is a figure showing an example of a rearranged order-on-display in the order placing priority to the newer date of final printing.

Meanwhile, in the embodiment, the order-on-display of print-job information was determined depending upon the print count of print-job information and the physical distance between the apparatus display-processing print-job information and the print-job holding apparatus. However, this is not limitative. For example, the order-on-display of print-job information may be determined by a rearrangement in the order of newer date-and-hour of final printing depending upon final-printing date-and-hour information, as shown in FIG. 22. Alternatively, the order-on-display of print-job information, corresponding to color or monochromatic data, may be determined by a rearrangement in a manner preferentially displaying color ones or monochromatic ones depending upon whether the print job is of color or monochromatic data. Alternatively, the order-on-display of print-job information may be determined by a rearrangement in a manner, say, preferentially displaying the greater data size of print-job information or preferentially displaying the smaller data size of print-job information, depending upon print-job data size. Alternatively, the order-on-display of print-job information may be determined by a rearrangement in a manner, say, preferentially displaying the greater number of pages thereof or preferentially displaying the smaller number thereof, depending upon print-job page count information. Alternatively, it may be in another structure than those or in a combination of those.

Meanwhile, in the embodiment, the order-on-display of print-job information was determined by rearranging the print-job information in the order of greater print count depending upon the print count of print-job information, rearranging it to such an order that the print-job information printing of which is not yet done at all is placed to the top, and rearranging it in the order of closer distance of among those pieces of print-job information equal in print count depending upon the physical distance between the apparatus display-processing print-job information and print-job holding apparatus (calculated from position information). However, this is not limitative. For example, print-job information may be first rearranged in the order of greater print count depending upon the print count of print-job information and then the order be changed in a manner of placing the print-job information printing of which is not yet done at all from the top, thereby determining an order-on-display of print-job information. In this manner, the three rearrangement processes may be desirably combined to determine an order-on-display of print-job information.

The embodiment explained the example to facilitate the finding from a display list a print job that is to be highly possibly print-processed by preferentially displaying the print jobs printing of which is not yet done at all from the top of the list and then preferentially displaying those in the order of greater print count. However, this is not limitative. Another way of display may be used in order to facilitate the finding, from a display list, a print job that is to be highly possibly print-processed.

Referring to FIGS. 23A to 25C, another example of how to display is described. FIGS. 23A-23C and 24A-24C show examples to display, with highlight, print-job information that is higher in possibility to make a printing. FIG. 25A shows an example provided with a search button with which search is made for print-job information that is higher in possibility to make a printing. FIG. 25B shows an example in which separately displayed is print-job information that is higher in possibility to make a printing.

Figure 23A:
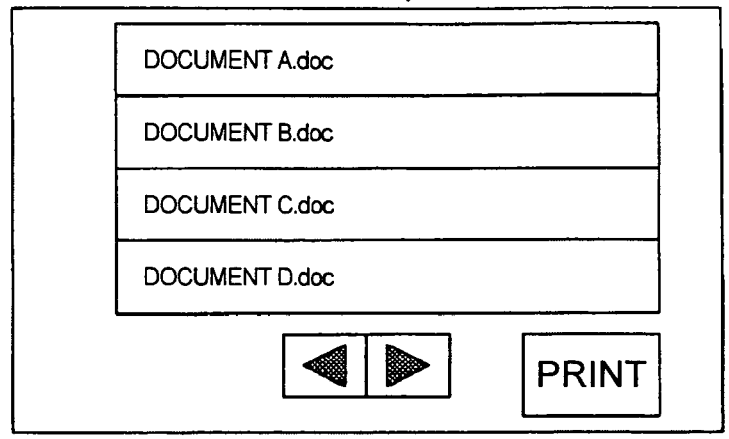
FIGS. 23A-23C are figures showing an example to display, with highlight, the print-job information higher in possibility to print.
Figure 23B:
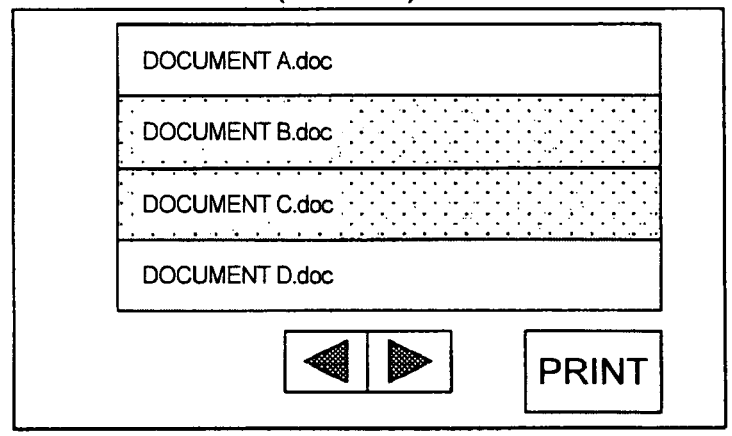
Figure 23C:
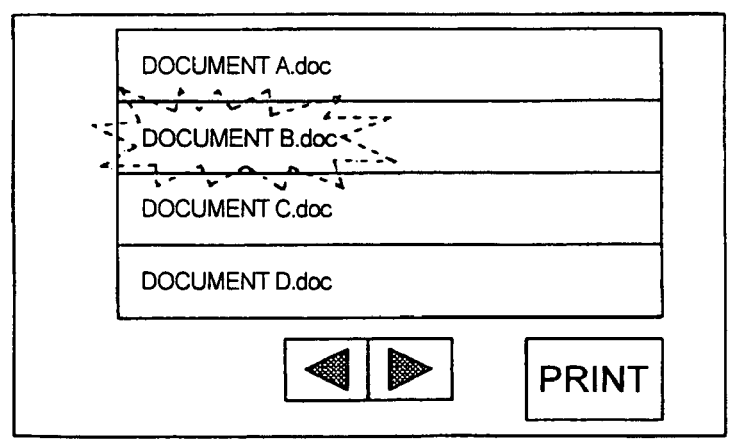

Description is now made on an example to display, with highlight, print-job information higher in possibility to make a printing. As shown in FIG. 23A, the character font, to display on a list of file names, etc. indicative of print-job information higher in possibility to make a printing, may be changed in color, form, size or the like to make conspicuous the displaying print-job information (file names, etc.). Otherwise, the background color, of print-job information higher in possibility to make a printing, may be changed to make conspicuous the print-job information displayed in a list, as shown in FIG. 23B. Otherwise, at least one of print-job information higher in possibility to make a printing or its background, may be displayed flickering or so, as shown in FIG. 23C. By thus displaying the print-job information with highlight in a list, the print-job information, higher in possibility to make a printing, may be made easy to find out of the list displayed.

Figure 24A:
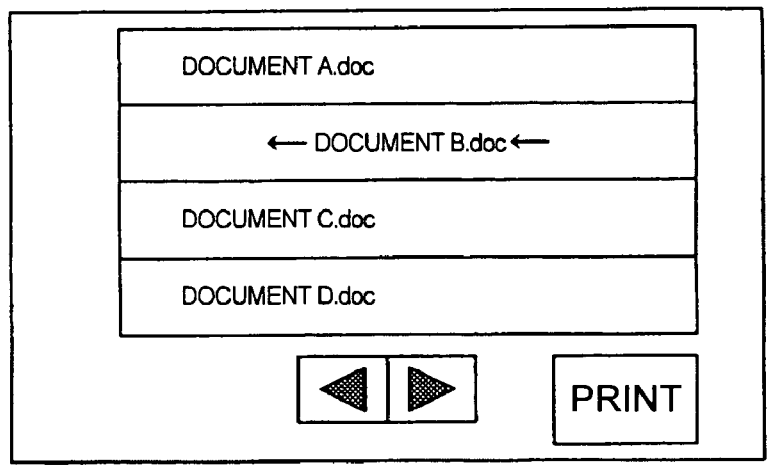
FIGS. 24A-24C are figures showing an example to display, with highlight, the print-job information higher in possibility to print.
Figure 24B:
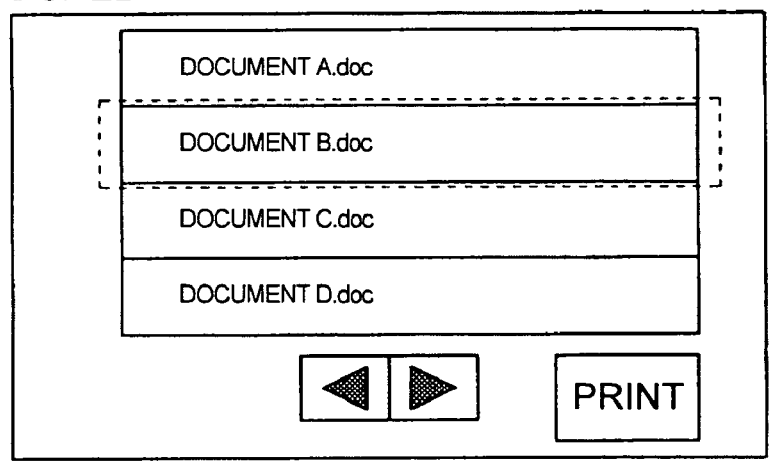
Figure 24C:
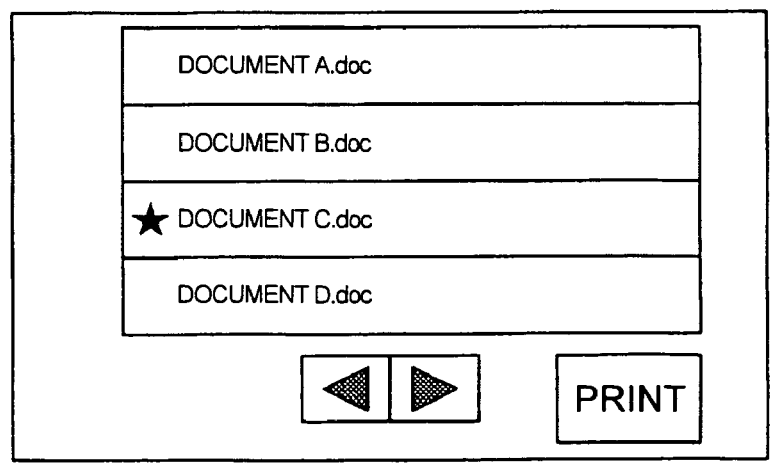

Description is now made on another example to display, with highlight, print-job information higher in possibility to make a printing. By scroll-displaying or so the print-job information higher in possibility to make a printing, the relevant print-job information may be animation-displayed as shown in FIG. 24A. Otherwise, by providing a frame to the print-job information higher in possibility to make a printing, the relevant print-job information may be ornamentally displayed as shown in FIG. 24B. Otherwise, by adding an icon such as a star mark to the print-job information higher in possibility to make a printing, the print-job information higher in possibility to make a printing may be displayed with enhancement. By doing so, the print-job information higher in possibility to make a printing may be made easy to find out of a list displayed.

As another example to make a display, a search button may be provided in the same screen as the list displayed as shown in FIG. 25A. By pushing down the search button through an input device, e.g. a mouse, the screen can be transited to a page having print-job information higher in possibility to make a printing. In this case, the print-job information higher in possibility to make a printing can be displayed with highlight. By further continuously pushing down the search button, transition can be made to a page having print-job information the next highest in possibility to make a printing, to display the relevant print-job information with highlight or so. Thus, each time the search button is pushed, print-job information may be displayed with highlight by switchover in the order of higher possibility to make a printing. By doing so, print-job information higher in possibility to make a printing may be made easy to find out of a list displayed.

Furthermore, as another example to make a display, a list may be displayed without a special rearrangement, to provide another frame than the list displayed on the same screen as the list displayed so that print-job information higher in possibility to make a printing can be displayed in the frame, as shown in FIG. 25B. By thus separately displaying the print-job information higher in possibility to make a printing collectively in the order of higher rank-on-display, the print-job information higher in possibility to make a printing may be made easy to find out of a list displayed.

Meanwhile, in the embodiment, when sending a request for print-job information containing collating information, the collating information acquired at the collating-information acquiring section 4$d$ was sent as it is without making a special processing. However, this is not limitative. Namely, the acquired collating information may be sent after processing the collating information with taking account of security. Due to this, where broadcasting the request for print-job information containing collating information to a plurality of apparatuses connected to a network 5, should the request be intercepted on the route, the encrypted collating information makes it difficult to specify the system user thus improving security.

What is claimed is:

1. A printing system wherein a plurality of printers, for printing depending upon a print job, are connected through a network, to hold print jobs over the plurality of printers so that information of the print job, for a predetermined system user, can be displayed of among the print jobs being held, the system comprising:

a collating-information acquiring section that acquires collating information to collate the system user;

a plurality of print-job holding sections that hold a plurality of print jobs corresponding respectively to and relevant to the plurality of printers, in association with the collating information;

a print-job-information acquiring section that acquires print-job information matched to the acquired collating information of among the information of the print jobs being held by the print-job holding sections;

a print-job-information display section that displays the acquired piece of print job information and, when displaying the print-job information, displays preferentially print-job information higher in possibility to make a printing of among those pieces of print-job information to display; and a print-count-information acquiring section that acquires information about a print count as to print job, the print-iob-information display section displaying the print-job information in an order of greater print count as to print job of among those pieces of print-job information to display, depending upon the print-count information acquired.

2. The printing system of claim 1, wherein a plurality of print-job holding apparatus, mated respectively to the plurality of printers, and a print-job manager are mutually connected, for data communication, through the network, the print-job holding apparatus having the print-job holding section, a print-job search section that searches a print job matched to the collating information out of the print jobs being held by the print-job holding section according to the collating information from the print-job manager, and a print-job-information transmitting section that sends, to the print-job manager, a searched piece of print-job information according to a request from the print-job manager, the print-job manager having the collating-information acquiring section, the print-job-information acquiring section and the print-job-information display section, the print-job-information acquiring section being to send, to the print-job holding apparatus, collating information acquired by the collating-information acquiring section and a request for print-job information matched to the collating information.

3. The printing system of claim 2, wherein the print-job acquiring section is to send the collating information acquired by the collating-information acquiring section to the apparatuses connected to the network, and perform a transmission process of the request depending upon a reply to the collating information thus sent, the apparatus having the print-job search section having a search-result-information transmitting section to send a search result due to the print-job search section to the print-job manager.

4. The printing system of claim 2, wherein the print-job manager has a search-information transmitting section to send search information for searching an apparatus having the print-job search section in each of the apparatuses connected to the network, the print-job acquiring section being to perform a transmission process of the collating information depending upon the reply, from the apparatus, to the search information, the apparatus having the print-job search section having a reply transmitting section to send, to the print-job manager, a reply to the search information.

5. The printing system of claim 2, wherein the print-job-information acquiring section is to send the collating information to another apparatus after encrypting the collating information.

6. The printing system of claim 1, wherein the plurality of printers and a print-job manager are mutually connected, for data communication, through the network,
the printer having the print-job holding section, a print-job search section that searches a print job matched to the collating information out of the print jobs being held by the print-job holding section according to the collating information from the print-job manager, and a print-job-information transmitting section that sends, to the print-job manager, a searched piece of print-job information according to a request from the print-job manager,
the print-job manager having the collating-information acquiring section, the print-job-information acquiring section and the print-job-information display section,
the print-job-information acquiring section being to send, to the printers, collating information acquired by the collating-information acquiring section and a request for print-job information matched to the collating information.

7. The printing system of claim 1, wherein a plurality of print instructors, for instructing the printer to make a printing of the print job according to an instruction from a system user, and a print-job manager are mutually connected, for data communication, through the network,
the print instructor having the print-job holding section, a print-job search section that searches a print job matched to the collating information out of the print jobs being held by the print-job holding section depending upon collating information from the print-job manager, and a print-job-information transmitting section that sends to the print-job manager a searched piece of print-job information according to a request from the print-job manager,
the print-job manager having the collating-information acquiring section, the print-job-information acquiring section and the print-job-information display section,
the print-job-information acquiring section being to send, to the print instructor, collating information acquired by the collating-information acquiring section and a request for print-job information matched to the collating information.

8. The printing system of claim 1, wherein the printer has the collating-information acquiring section, the print-job holding section, a print-job search section that searches a print job matched to the collating information out of the print jobs being held in the print-job holding section according to the collating information, a print-job-information acquiring section that acquires, from another of the printers, print-job information matched to the collating information acquired in an own printer, a print-job-information transmitting section that sends to the other printer a searched piece of print-job information according to the collating information acquired from the other printer, in response to the request from the other printer, and the print-job-information display section, the print-job-information acquiring section being to send, to the other printer, collating information acquired by the collating-information acquiring section and a request for print-job information matched to the collating information, the print-job-information display section being to display the searched piece of print-job information and print-job information acquired from the other printer.

9. The printing system of claim 1, wherein the plurality of printers and print-job managers mated respectively to the plurality of printers are mutually connected, for data communication, through the network, the print-job manager having the collating-information acquiring section, the print-job holding section, a print-job search section that searches a print job matched to the collating information out of the print jobs being held in the print-job holding section according to the collating information, a print-job-information acquiring section that acquires, from another print-job manager, print-job information matched to the collating information acquired in the print-job manager of an own, a print-job-information transmitting section that sends, to the other print-job manager, a searched piece of print-job information according to the collating information acquired from the other print-job manager, in response to the request from the other print-job manager, and the print-job-information display section, the print-job-information acquiring section being to send, to the other print-job manager, collating information acquired by the collating-information acquiring section and a request for print-job information matched to the collating information, the print-job-information display section being to display the searched piece of print-job information and the print-job information acquired from the other print-job manager.

10. The printing system of claim 1, further comprising a print-job-information selecting section that selects, according to an instruction from the system user, print-job information matched to the instruction, out of displayed pieces of print-job information due to the print-job-information display section, and a printing section that causes a predetermined one of the printers to make a printing of a selected piece of print job information due to the print-job-information selecting section.

11. The printing system of claim 1, further comprising a print-job-information selecting section that selects, according to an instruction from the system user, print-job information matched to the instruction, out of displayed pieces of print-job information due to the print-job-information display section, and a print-job deleting section that deletes a print job corresponding to the selected piece of print job information due to the print-job-information selecting section from an apparatus holding the print job.

12. The printing system of claim 1, further comprising a print-count-information acquiring section that acquires information about a print count as to print job, the print-job-information display section being to display preferentially the print-job information, printing of which is not yet done, of among those pieces of print-job information to display, depending upon the print-count information acquired.

13. The printing system of claim 1, further comprising a positional-relationship-information acquiring section that acquires positional-relationship information between an apparatus having the print-job display section and an apparatus having the print-job holding section, the print-job-information display section is to display preferentially print-job information held in the print-job holding section as physical distance is closer between the apparatus having the print-job display section and the apparatus having the print-job-information holding section of among those pieces of print-job information to display, depending upon the positional-relationship information acquired.

* * * * *